United States Patent [19]
Chaar et al.

[11] Patent Number: 5,960,404
[45] Date of Patent: Sep. 28, 1999

[54] MECHANISM FOR HETEROGENEOUS, PEER-TO-PEER, AND DISCONNECTED WORKFLOW OPERATION

[75] Inventors: Jarir K. Chaar, Tarrytown; Brent T. Hailpern, Katonah, both of N.Y.; Edwin S. Park, Middletown, N.J.; Santanu Paul, New York, N.Y.

[73] Assignee: International Business Machines Corp., Armonk, N.Y.

[21] Appl. No.: 08/919,838

[22] Filed: Aug. 28, 1997

[51] Int. Cl.[6] .............................. G06F 17/60; G06F 9/44
[52] U.S. Cl. .................................... 705/8; 705/9; 705/11; 707/104; 395/672; 395/674
[58] Field of Search ................... 705/7, 8, 9, 1, 705/10, 11; 395/670, 672, 673–677; 707/1, 100, 101, 103, 104

[56] References Cited

U.S. PATENT DOCUMENTS

| | | | |
|---|---|---|---|
| 5,535,322 | 7/1996 | Hecht | 705/1 |
| 5,721,912 | 2/1998 | Stepczyk et al. | 707/102 |
| 5,721,913 | 2/1998 | Ackroff et al. | 707/103 |
| 5,802,493 | 9/1998 | Sheflott et al. | 705/1 |
| 5,809,265 | 9/1998 | Blair et al. | 345/339 |
| 5,819,263 | 10/1998 | Bromley et al. | 705/3 |
| 5,826,020 | 10/1998 | Randell | 395/200.32 |
| 5,826,239 | 10/1998 | Du et al. | 705/8 |
| 5,828,375 | 10/1998 | Nomura et al. | 345/339 |

FOREIGN PATENT DOCUMENTS 197 12 946
 A1   12/1997   Germany .
WO 97/07472   2/1997   WIPO .

Primary Examiner—James R. Trammell
Assistant Examiner—Cuong H. Nguyen
Attorney, Agent, or Firm—Scully, Scott, Murphy & Presser; Kevin M. Jordan, Esq.

[57] ABSTRACT

A mechanism for heterogeneous, peer-to-peer, and disconnected workflow execution across a network infrastructure. Performer Agent entities provide a homogeneous view of humans, applications, and heterogeneous workflow systems and components that act as Performers on the network by executing Tasks. Source Agent entities provide a homogeneous view of heterogeneous service requesters such as workflow scripts executing on different workflow systems, which generate Activities that need to execute on Performers as Tasks. Task Request and Task Response messages are used to standardize the communication between Source Agents and Performer Agents, along with other messages for controlling and queuing Tasks. Workflow systems interact with each other as peers using this mechanism by sending workflow execution requests, workflow script templates, and workflow execution environments to each other. Disconnected operation is handled by ensuring the continuous availability of Source Agents and Performer Agents on the network and providing a mechanism for Sources to disconnect from Source Agents and Performers to disconnect from Performer Agents.

48 Claims, 25 Drawing Sheets

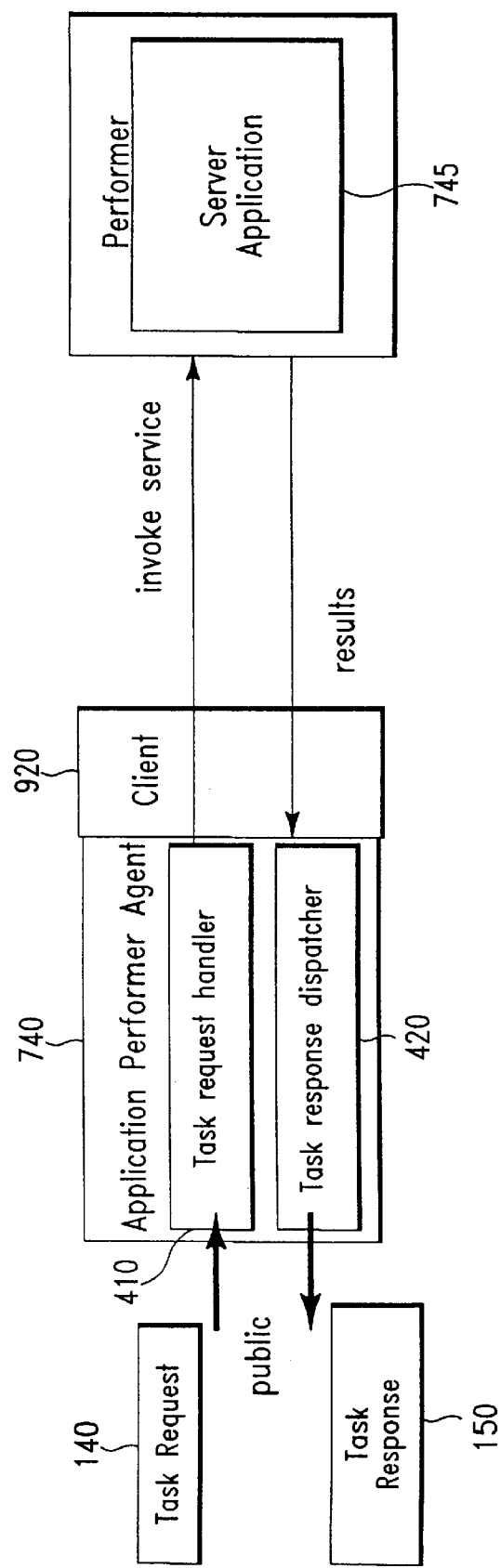

MECHANISM FOR HETEROGENEOUS, PEER-TO-PEER, AND DISCONNECTED WORKFLOW OPERATION

BACKGROUND OF THE INVENTION

The present invention is related to workflow management systems, and in particular to a distributed computer system for workflow execution across a network infrastructure.

Workflow systems are essential to organizations that need to automate their business processes. Workflow systems allow organizations to specify, execute, and monitor their business processes in an efficient manner over enterprise-level networks. This has the net effect of improved throughput of processes, better utilization of organizational resources, and improved tracking of processes.

Many workflow systems are commercially available. Even though many workflow systems exist, interoperability across these systems is a technical problem. The systems are monolithic and proprietary, and workflows cannot extend beyond a single workflow system. To solve this problem, the Workflow Management coalition (WfMC), an industry-wide consortium of major workflow system vendors, has defined a standard workflow architecture, described in the document "The Workflow Reference Model" [WFMC-TC-1003]. The model defines the major components of a workflow system and a set of interfaces between workflow system components. The major components it describes are a Process Definition or Builder Tool to capture business process logic in a high-level notation; a Workflow Server that acts as the nerve center of the workflow system; Workflow Clients that are used by users to view and interact with the contents of their worklists; Workflow Applications that are invoked by the workflow server to perform automated activities; and finally, Administration & Monitoring Tools used to administer the execution and monitor the status of work flowing through the workflow system using Audit Data.

The WfMC Reference Model also defines interfaces between these components. Interface 1 (builder-server interface) defines a common process definition format for the interchange of static process specifications between a Process Definition Tool and a Workflow Server [WFMC-WG01-1000]. Interface 2 (client-server interface) defines an API that provides a complete range of interactions between a Workflow Client and a Workflow Server [WFMC-TC-1009]. These include worklist interaction, query and control of workflow processes and their activities, and administrative functions. Interface 3 (application invocation interface) is not currently available, but is intended to describe how applications are invoked. Interface 4 (server-server interface) defines an API that describes the interactions between two Workflow Servers [WFMC-TC-1012]. Interactions include initiation, query and control of workflow processes and their activities, and administrative functions. Finally, Interface 5 (monitor-server interface) defines audit data for administrating and monitoring a Workflow Server [WFMC-TC-1015].

The WfMC standard has significant weaknesses that make it unsuitable for a heterogeneous, distributed computing environment. Specifically, the design of current workflow systems based on the WfMC standard makes them inappropriate for workflow execution across wide area networks such as the Internet, where scalability, flexibility, and interoperability across heterogeneous systems and networks is the needed. The weaknesses of the WfMC architecture stem from the monolithic nature of the workflow server, which is responsible for process execution, management of the Staff Directory, binding of activities to participants and distribution of work items to appropriate workflow participants (performing role and group resolution as necessary), worklist management for all workflow participants who receive work items from the server, and application invocation. This leads to the following problems:

1. Participants cannot be shared by multiple workflow systems: Since participant worklists are hidden within the workflow server and are not externally addressable, processes are only able to send work items to worklists that reside in the same workflow server. Thus, in order for a participant to participate in multiple workflows running on heterogeneous servers, an identity and a worklist must be maintained separately inside each workflow server the client wishes to receive work from. In addition, the workflow client must now manage multiple client connections to each of these workflow servers in order to receive work. This overloads the client application with unnecessary functionality; whenever a participant wishes to participate in a large number of workflow applications from different servers, the participant has to connect to each server and explicitly 'pull' work from it. Because of the complexity in the client, this architecture is not suitable for workflow participation using thin clients and lightweight, portable computing devices such as personal digital assistants. From a distributed design perspective, this is an unscalable solution.

2. Participants cannot work in disconnected mode: Even though work items are logically owned by the workflow participants, the WfMC architecture assigns the task of managing work items to the workflow server. Consequently, the participant interacts with a remotely located work item, and each interaction between the participant and an associated work item results in a remote access (usually a Remote Procedure Call (RPC)). While this design has potential benefits when work items must implement some server-side functionality, it imposes severe constraints on disconnected workflow participation, since the network must be constantly available for the participant to do any work. The WfMC standard also involves workflow servers in client-side application invocation, via the proposed Interface 3. For example, if a participant needs to invoke a local application such as a word processor as part of a work item, the workflow server that owns the work item must invoke the word processor on the participant's behalf on the participant's machine via the proposed Interface 3. The consequence of this intrusive approach is that participants can work only when directly connected to the workflow server-they cannot operate in a disconnected mode.

3. The execution of work is not transparent: The WfMC architecture makes clear distinctions between how the server assigns work items to human participants, how it invokes workflow scripts on other servers, and how it manages application invocation. For the first, it assigns work items to its internal worklist and expects the participant to explicitly 'pull' the contents of the worklist using Interface 2. For the second, it explicitly 'pushes' a request to another server using Interface 4. For the third, it performs a synchronous procedure call using Interface 3.

Treating work in three different ways leads the server to early judgments about the actual implementation of an activity. This leads to a loss of transparency, and makes it difficult for a work item at the level of the requesting server to be dynamically bound and implemented as a workflow by a participant domain at execution time.

U.S. Pat. No. 5,530,861 describes a task management method that allows humans to receive and manage tasks from different sources such as other individuals, process engines, and application agents. The task management scheme assumes that tasks are always performed by humans, and provides a standard way in which a human user can interact with tasks assigned to the user. The method does not deal with interoperability of workflow systems. It also does not deal with distributed workflow execution with respect to how tasks can be treated uniformly across application invocations, workflow script executions on heterogeneous systems, and human participants across a network. It does not deal with issues of disconnected operation, and recursive, dynamic workflow execution.

SUMMARY OF THE INVENTION

The present invention deals with the use of a distributed computer system that spans local-area networks (LANs), wide-area networks (WANs), and global networks and provides a homogeneous view of heterogeneous workflow systems and components. The system is called a distributed workflow system. As a result of the present invention, workflow scripts or applications can be executed in a scalable manner using components scattered across the distributed workflow system. The present invention facilitates peer-to-peer interactions between multiple autonomous and proprietary workflow systems. The present invention also facilitates disconnected or occasionally connected operation of workflow components.

The present invention achieves the following desirable features:

1. Workflows executing on different workflow servers can reuse the same service providers, components, or applications on the network. Workflow participants can receive work from and interoperate with heterogeneous, proprietary workflow servers without using proprietary or dedicated workflow clients.

2. Human workflow participants need to interact with a single Worklist, which is addressable by different workflow servers, and receives all work on behalf of the participant.

3. Workflow-enabled applications and components can be developed and installed by third-parties on the network, and these applications and components can be utilized by and interoperate with multiple workflow servers.

4. Workflow servers can use a wide range of internal workflow execution mechanisms, ranging from rule-based workflow interpretation to control-flow based graph interpretation to hardwired workflow applications or scripts, and operate seamlessly within the distributed workflow system.

5. Heterogeneous and proprietary workflow servers installed in different organizations can interoperate by triggering pre-installed workflow applications on each other, or by downloading workflow applications to each other on demand.

6. Workflow participants, designers, and administrators can participate in workflows even when they are disconnected or occasionally connected to the network.

7. Workflow servers are treated like any other workflow participant; hence, work assigned to a participant may be dynamically refined and implemented as an independent workflow. This allows dynamic workflow decomposition, or late-binding of work to workflows.

These improvements are accomplished by providing:

1. A workflow abstraction called Source that represents a workflow or service requestor that generates a sequence of service requests as part of a process execution.

2. A workflow abstraction called Performer that represents a service provider (human, application, or workflow server) that provides services in response to service requests generated by Sources.

3. A workflow component called Source Agent that acts as a proxy to a Source. The Source Agent is always connected to the network and represents the Source in its interactions with Performers. The Source may be occasionally connected to its Source Agent.

4. A workflow component called Performer Agent that acts as a proxy to a Performer. The Performer Agent is always connected to the network and represents the Performer in its interactions with Sources. The Performer may be occasionally connected to its Performer Agent.

5. A workflow message called Task Request that represents a service request sent to a Performer; and a workflow message called Task Response returned to a Source as a service response.

6. A continuously available Network that allows Source Agents and Performer Agents to communicate with each other.

In addition, the present invention provides a mechanism for disconnected workflow participation. An occasionally available Source-side network allows a Source to connect and disconnect from its Source Agent. Similarly, a Performer-side network allows a Performer to connect and disconnect from its Performer Agent.

The present invention provides a mechanism for heterogeneous, autonomous, workflow systems or servers to execute on the same distributed workflow system. Sources may be workflow scripts executing on a wide variety of workflow systems, or they may be hardwired process-based programs.

The subject invention provides a mechanism for heterogeneous service providers or Performers to present a common interface to the Sources in the distributed workflow system. Performers may be humans participants, or heterogeneous programs and applications, or workflow servers that can execute other workflows.

The present invention provides mechanisms for Performer Agents and Performers to interact in different ways. The most common interaction occurs when a Performer Agent acts as a Worklist (or inbox) for its Performer, which acts as a Pull client. Since the Performer Agent is addressable on the network, various Sources can send work to the Performer via its Performer Agent, without the Performer having to pull work from each of them. Another interaction mechanism is when a Performer Agent acts as a client to its Performer, which is a program or application. Another interaction mechanism allows the Performer Agent to act as Push Server for the Performer.

The present invention provides a mechanism for heterogeneous workflow servers to implement Source and Performer interfaces appropriately and thus engage in peer-to-peer workflow operation. The peer-to-peer operation allows workflow servers to both receive work from and assign work to other workflow servers.

The present invention provides mechanisms for workflow scripts and workflow execution environments to be downloaded across domains on demand. The present invention provides a mechanism by which Worklists associated with Performers are managed on the network by independent Worklist Servers, outside the scope of the Workflow Server.

The present invention provides a mechanism by which Performer Agents can be located on the network using a directory or trading service.

These and other improvements are set forth in the following detailed description. For a better understanding of the present invention with advantages and features, refer to the description and to the drawings.

BRIEF DESCRIPTION OF THE DRAWINGS

FIG. 9 shows how a Performer Agent can act as a client to a backend server or application.

The detailed description explains preferred embodiments of our invention, together with advantages and features, by way of example with reference to the following drawings.

DETAILED DESCRIPTION OF THE INVENTION

Basic Structure of a Preferred Embodiment of the Invention

Figure 1:
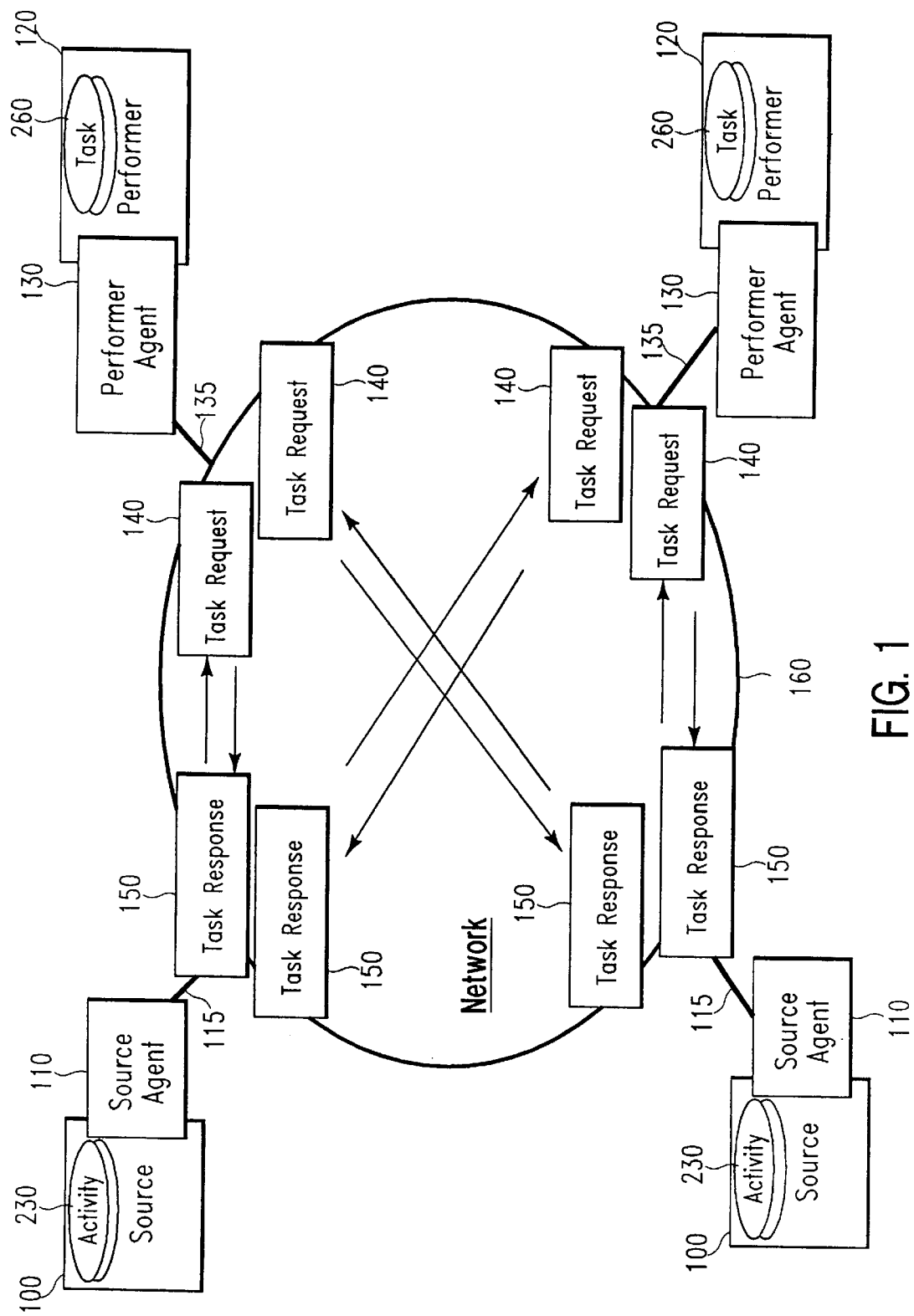
FIG. 1 shows schematically an overview of a preferred embodiment and particularly shows how the distributed workflow system allows multiple workflow Source and Performer entities to interoperate using a public communication protocol that uses Task Request and Task Response messages.

In a preferred embodiment of the present invention, the distributed workflow system for heterogeneous, peer-to-peer, and disconnected operation is a collection of cooperating computer programs on the network, as shown in FIG. 1. Specifically, the computer programs are implemented as distributed Java objects, and utilize the Remote Method Invocation mechanism developed by Javasoft, Inc. for communication. While the preferred embodiment makes use of distributed object technology and the Java programming language, any general-purpose message passing mechanism and programming language is sufficient to implement the features of the present invention. For the purposes of teaching this invention, the following description of a preferred embodiment uses the general concepts of messages and entities, instead of the object-oriented terminology of objects and method invocations.

According to the present invention, Sources 100 and Performers 120 exchange standard messages with each other to execute workflows on a network. A typical Source 100 is a workflow script that executes within some workflow system. An example of a workflow script would be a Business Loan Approval process in a bank, which executes as a sequence of steps whenever a business applies for a loan. The first step would be to collect all the information from the applicant by a customer representative. Next, two steps can occur in parallel. The business plan can be checked by an expert familiar with the line of business. At the same time, the repayment plan can be checked by a banker for feasibility. If both these steps are successful, a credit evaluation firm would be notified to check the credit history of the applicant. If it is favorable, a decision to issue a loan would be made by the bank, and the applicant notified. In this example, the Business Loan Approval process would be implemented as a workflow script within a workflow system, and the script would be called a Source 100.

In the example, Performers 120 are entities that execute the steps, such as the customer representative, the expert, the banker, and the credit evaluation firm. Performers 120 can be humans, computer programs and applications, organizations, etc. that provide services to Sources 100 such as workflow scripts. Multiple Sources 100 can share the services of the same Performer 120. For example, the same credit evaluation firm could be used as a Performer 120 by many different banks, and the same expert can evaluate many loan applications.

According to the present invention, a Source Agent 110 is a proxy for a Source 100 and a Performer Agent 130 is a proxy for a Performer 120. A Source Agent 110 is a computer program written in the Java programming language that generates service requests on behalf of a Source 100. The Performer Agent 130 is also a computer program written in the Java programming language that receives service requests on behalf of a Performer 120. A Task Request 140 is a message that contains a service request sought by a Source 100 from a Performer 120. A Source Agent 110 sends Task Requests 140 to appropriate Performer Agents 130, and receives Task Responses 150 on behalf of the Source 100. A Performer Agent 130 receives Task Requests 140 and returns Task Responses 150 to the appropriate Source Agents 110. In a preferred embodiment, Source Agents 110 and Performer Agents 130 are implemented as distributed Java objects on the Network 160. The Source Agent 110 is continuously connected to the Network 160 via a connection 115. Similarly, the Performer Agent 130 is continuously connected to the Network 160 via a connection 135.

In a preferred embodiment, Source Agents 110 and Performer Agents 130 are treated as abstract interfaces written in Java, and concrete classes with specific Source Agent 110 and Performer Agent 130 semantics are defined to implement the abstract interfaces. This is in keeping with good object-oriented technology principles. For the purposes of this example, Source Agents 110 and Performer Agents 130 are treated as the concrete implementations as opposed to abstract interfaces, with no loss of generality.

Flow of Work

Figure 2A:
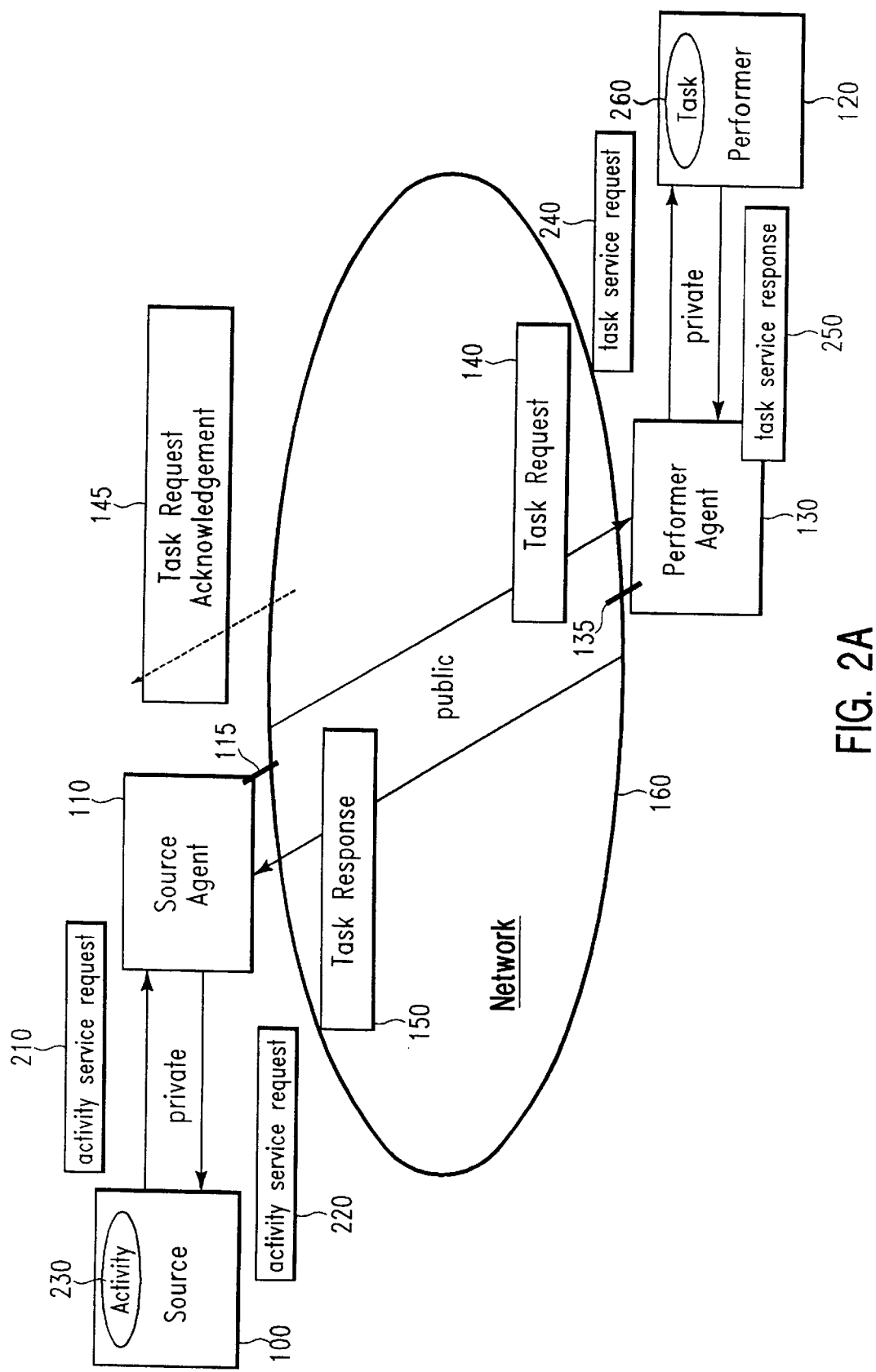
FIG. 2A shows how a Source assigns Tasks to a Performer, and the return of results to a Source from a Performer.

According to the present invention, work flows through the distributed workflow system via a combination of private and public messages described in FIG. 2A. A Source 100 generates Activities 230, which are its private representation of individual units of work. To execute an Activity 230, the Source 100 issues an activity service request message 210 using its own private communication protocol that is received by its Source Agent 110. The Source Agent 110 translates the activity service request 210 into a standard Task Request message format 140 and sends it to a Performer Agent 130. The Performer Agent 130 acknowledges the Task Request message 140 by immediately returning a Task Request Acknowledgment 145 containing a Task ID to the requesting Source Agent 110, which can then use the Task ID for future reference. Next, the Performer Agent 130 translates the public Task Request message 140 into a private task service request message 240 for its Performer 120. The Performer 120 receives this message and creates a Task 260, which is its private representation of a unit of assigned work. After the Task 260 is completed, a private task service response message 250 containing the Task results is returned to the Performer Agent 130. The Performer Agent 130 translates this message into a standard Task Response message 150 and returns it to the appropriate Source Agent 110 that originated the Task Request message 140. The Source Agent 110 then translates the Task Response message 140 back into a private activity service response message 220 and sends it back to the Source 100, thus completing the Activity 230.

Figure 2B:
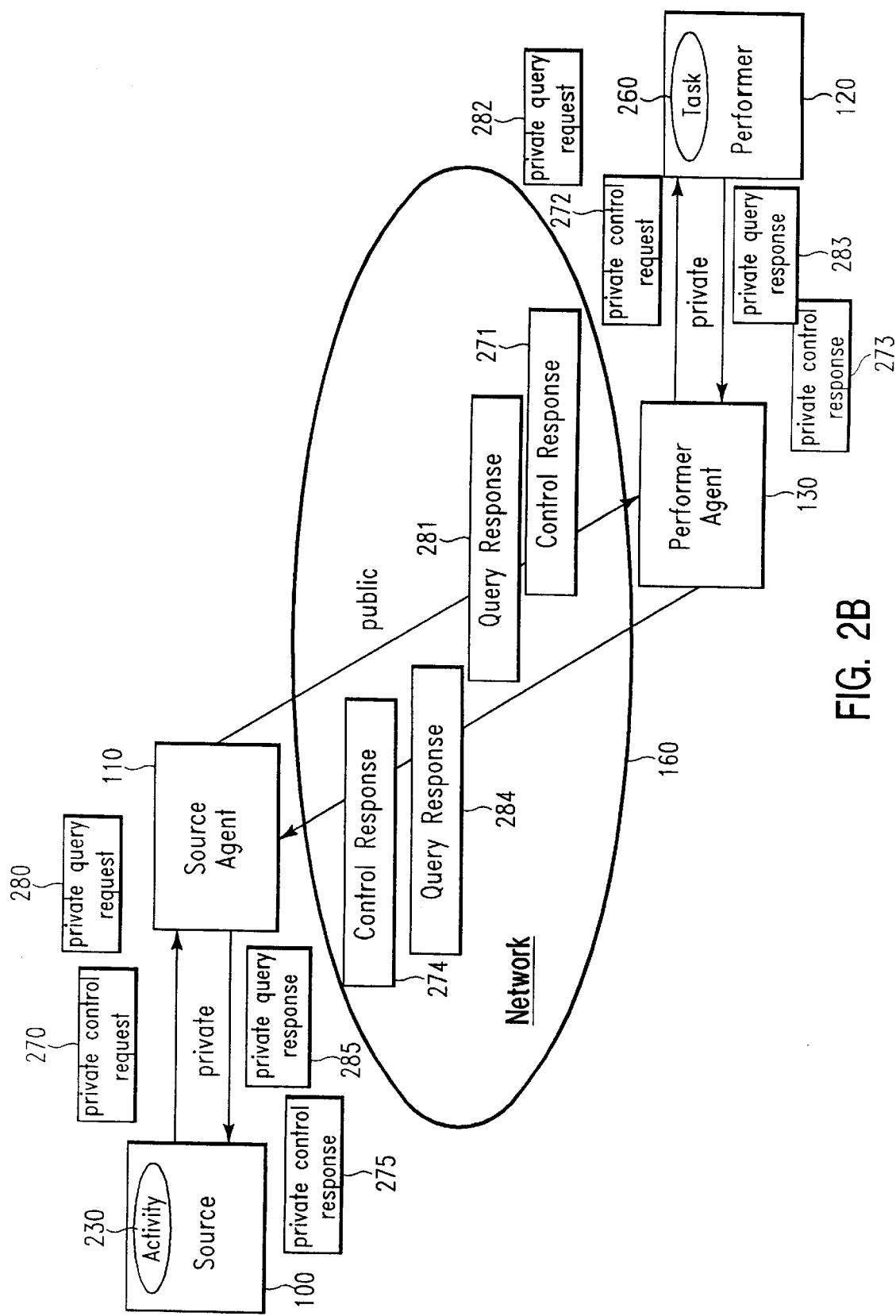
FIG. 2B shows how a Source controls and queries tasks on a Performer.

The present invention also allows Sources 100 to issue task control and task query requests to Performers 120, as shown in FIG. 2B. When an executing Activity 230 in a Source 100 needs to be aborted, suspended, or resumed, the Source 100 sends a private control request 270 to its Source Agent 110 via its private protocol. The Source Agent 110 then generates a standard Control Request 271 and sends it to the Performer Agent 130 that is executing a Task 260 on behalf of the Activity 230. Based on the contents of the Control Request 271, the Performer Agent 130 takes the necessary proprietary or internal action to either abort, suspend, or resume the Task 260 on the Performer 120. Next, the Performer Agent 130 returns a Control Response 274 to the Source Agent 110. Similarly, the Source 100 may wish to query the status of a Task 260 running on a Performer 120. It sends an appropriate query request 280 to its Source Agent 110 via its private protocol. The Source Agent 110 then generates a standard Query Request 281 and sends it to the Performer Agent 130 that is executing the Task 260. The Performer Agent 130 interacts with the Performer 120 to get the status of the Task 260. Finally, the Performer Agent 130 returns the status to the requesting Source Agent 110 via a standard Query Response 284. It is important to note that both Control Request 271 and Query Request 281 contain the Task ID of the Task that needs to be controlled or queried, which is obtained as a part of the Task Request Acknowledgment 145 in FIG. 2A.

It is important to note here that the communication between a Source 100 and a Source Agent 110, as well as that between a Performer 120 and Performer Agent 130, happens via proprietary or private communication protocols. However, the communication between Source Agents 110 and Performer Agents 130 happens via a public communication protocol that defines standard messages such as Task Request 140 and Task Response 150 messages. This allows arbitrary Sources 100 and Performers 120 to communicate with each other. The other important concept is that for every private Activity 230 generated inside a Source 100, a corresponding Task 260 is created and executed on a Performer 120. There is thus a one-to-one correspondence between Activities 230 and Tasks 260.

Figure 3:
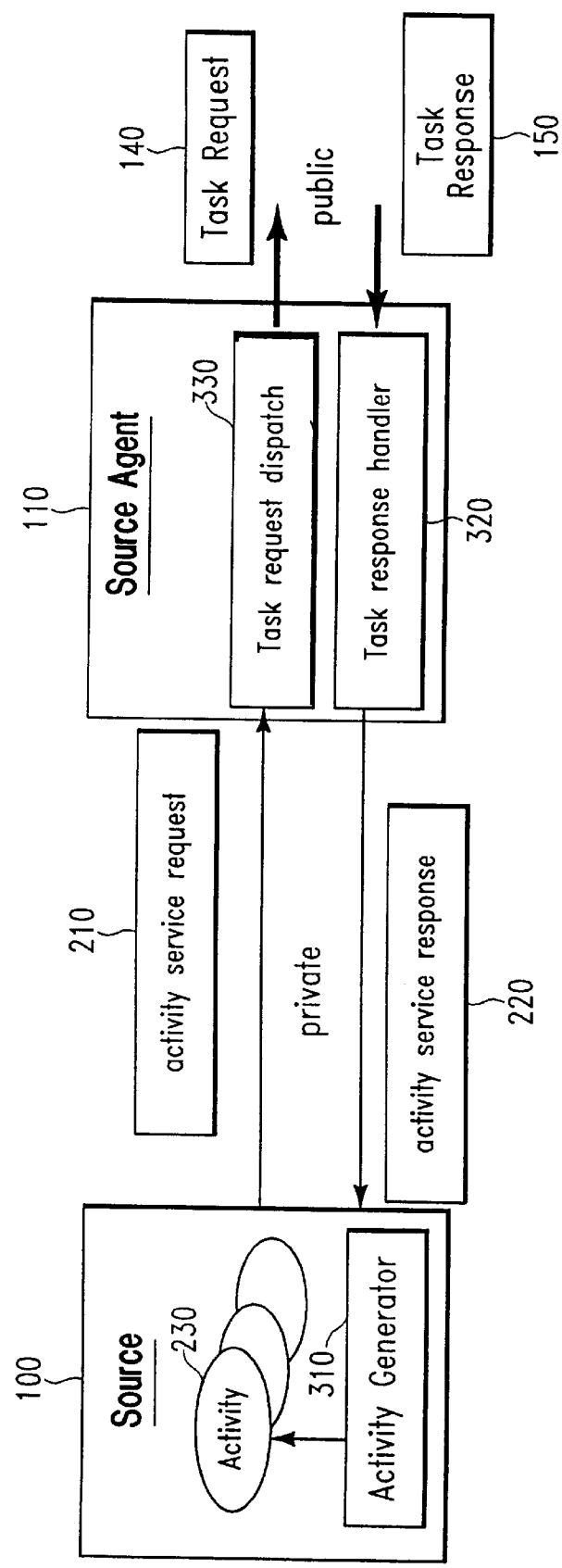
FIG. 3 shows how a Source exchanges Activity service requests and responses with its Source Agent via a private communication protocol.

According to the present invention, Sources 100 and Source Agents 110 contain certain internal components, as shown in FIG. 3. A Source 100 consists of an Activity Generator mechanism 310 that is responsible for generating Activities 230. Usually, this is an execution mechanism of a workflow script. The Source Agent 110 consists of a Task Request Dispatcher component 330 that is responsible for receiving Activity Service Requests 210 and generating and forwarding Task Requests 140. It also consists of a Task Response Handler component 320 that is responsible for receiving Task Responses 150 from the network 160 and returning Activity Service Responses 220 to the Source 100. It is important to note that the core function of the Source Agent 110 is to receive responses on behalf of the Source; an alternative implementation would be to have the Task Request Dispatcher 330 outside the Source Agent 110, and use the latter merely as a way to receive Task Responses 150 over the Network.

Figure 4:
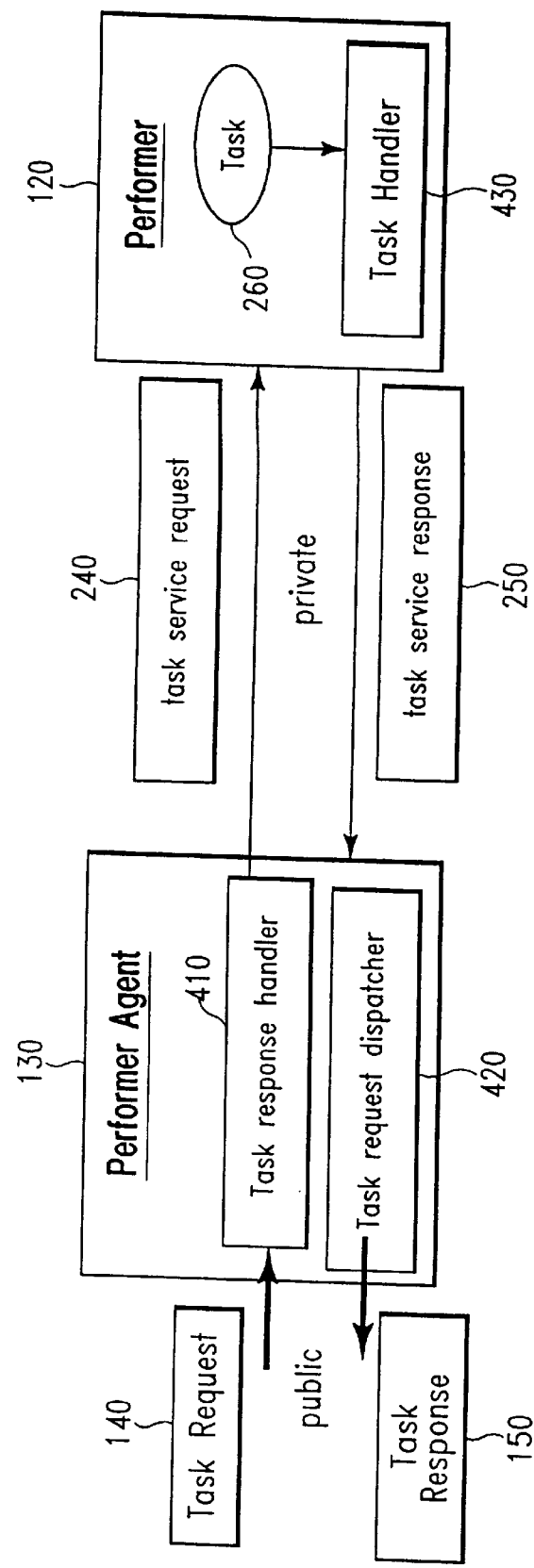
FIG. 4 shows how a Performer Agent exchanges task service requests and responses with its Performer via a private communication protocol.

Symmetrically, according to the present invention, Performers 120 and Performer Agents 130 contain certain internal components, as shown in FIG. 4. A Performer 120 consists of a Task Handler mechanism 430 that is responsible for executing Tasks 260 that correspond to Activities 230 on the Source side 100. The Performer Agent 130 consists of a Task Request Handler component 410 that is responsible for receiving Task Requests 140 and instantiating Tasks 260 on the Performer 120. It also consists of a Task Response Dispatcher component 420 that receives Task Service Responses 250 from the Performer 120 and returns Task Responses 150 to the Source 100 over the network 160. It is important to note that core function of the Performer Agent 130 is to receive requests on behalf of the Performer; an alternative implementation would be to have the Task Response Dispatcher 420 outside the Performer Agent 130, and use the latter merely as a way to receive Task Requests 140 over the Network.

Structure of Task Requests and Responses

Figure 5:
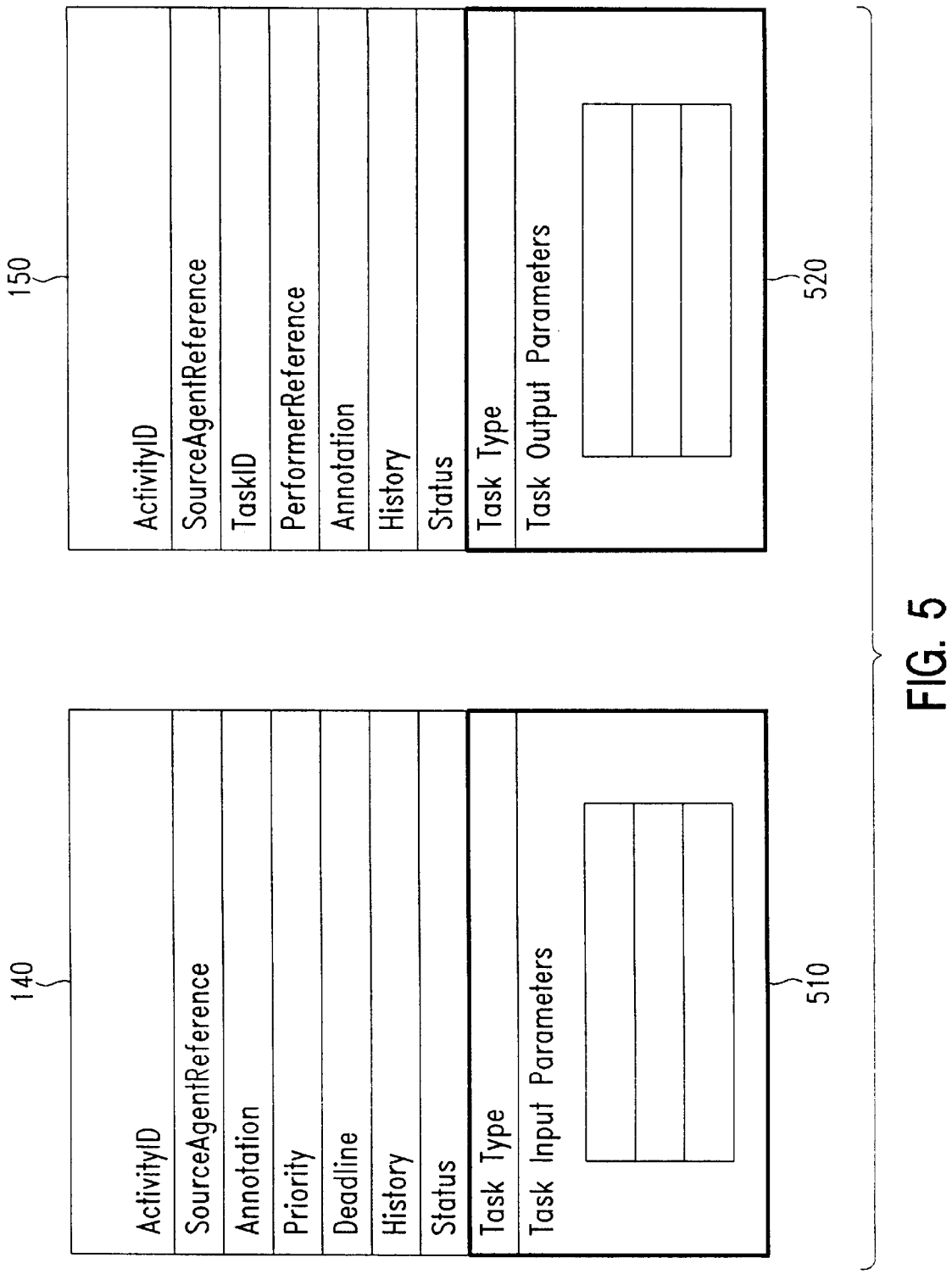
FIG. 5 shows the structure of the Task Request and Task Response messages exchanged between Source Agents and Performer Agents.

According to the present invention, Task Requests 140 and Task Responses 150 are standard message formats that allow an arbitrary pair of Source Agents and Performer Agents to communicate with each other. FIG. 5 describes the structure of these messages.

A Task Request message 140 necessarily consists of:

An Activity ID, that uniquely identifies the Activity 230 to which this Task Request corresponds.

A Source Agent Reference, that uniquely identifies the requesting Source Agent 110, and is used by the Task Response Dispatcher 420 to return a Task Response 150 to the proper Source Agent 110.

A Task-specific component 510 that specifies the exact type of Task 260 to be created on the Performer 120, and the input parameters required to instantiate such a Task 260 on the Performer 120.

Optionally, a Task Request 140 may also contain:

An Annotation that provides a textual description of the Task Request.

Priority information about the Task Request, which potentially allows the Performer to prioritize Tasks.

Deadline information about the Task Request, which indicates that the Performer should react within a certain time frame.

Status information about the Task Request, indicating whether the Task Request has been forwarded, modified, etc.

History or Log of the Task Request, a detailed description of the origin and routing of the Task Request.

Similarly, a Task Response message 150 necessarily consists of:

An Activity ID, that uniquely identifies the original Activity 230 to which this Task Response corresponds. This is copied back from the Activity ID on the corresponding Task Request message 140.

A Source Agent Reference, that uniquely identifies the requesting Source Agent 110.

A Performer Agent Reference, that uniquely identifies the Performer Agent 130 that executed the Task Request 140 to the Source 100, for future reference.

A Task ID, that uniquely identifies the Task 260 that executed on the Performer 120 to the Source 100, for future reference.

A Task-specific component 520 that specifies the exact type of Task 260 executed on the Performer 120, and the output parameters computed as a result of the Task execution.

Optionally, a Task Response 150 may also contain:

An Annotation that provides a textual description of the Task Response.

Status information about the Task Response, indicating whether the Task Request executed correctly, failed, was forwarded, etc.

History or Log of the Task Response, a detailed description of the routing and return of the Task Request and Task Response respectively.

The Task Request 140 and Task Response 150 messages provide a standard communication mechanism between Source Agents 110 and Performer Agents 130 that is at the core of the present invention. It enables the interoperability between heterogeneous, proprietary workflow components that are either Sources 100 or Performers 120. In a preferred embodiment, the Task Request 140 and Task Response 150 messages are implemented as serializable Java objects that are exchanged between Source Agent 110 and Performer Agent 130 which are computer programs written as distributed Java objects. The exchange happens through the Remote Method Invocation mechanism in Java that allows remote methods to be invoked on distributed Java programs.

An alternative implementation of Task Requests 140, Task Responses 150, and the communication between Source Agents 110 and Performer Agents 130 is possible using electronic mail systems. The Task Request 140 and Task Response 150 messages can be implemented using the publicly available MIME encoding standard for Internet electronic mail. The Source Agents 110 and Performer Agents 130 can be implemented as electronic mail boxes.

Heterogeneity of Components

The present invention enables workflow operation between heterogeneous workflow systems and components. This is achieved by the definition of standard Task Request 140 and Task Response 150 message formats. Source Agents 110 and Performer Agents 130 translate between these standard message formats and private (or proprietary) representations of Activities 230 inside Sources 100 and Tasks 260 inside Performers 120.

Sources and Source Agents

Figure 6:
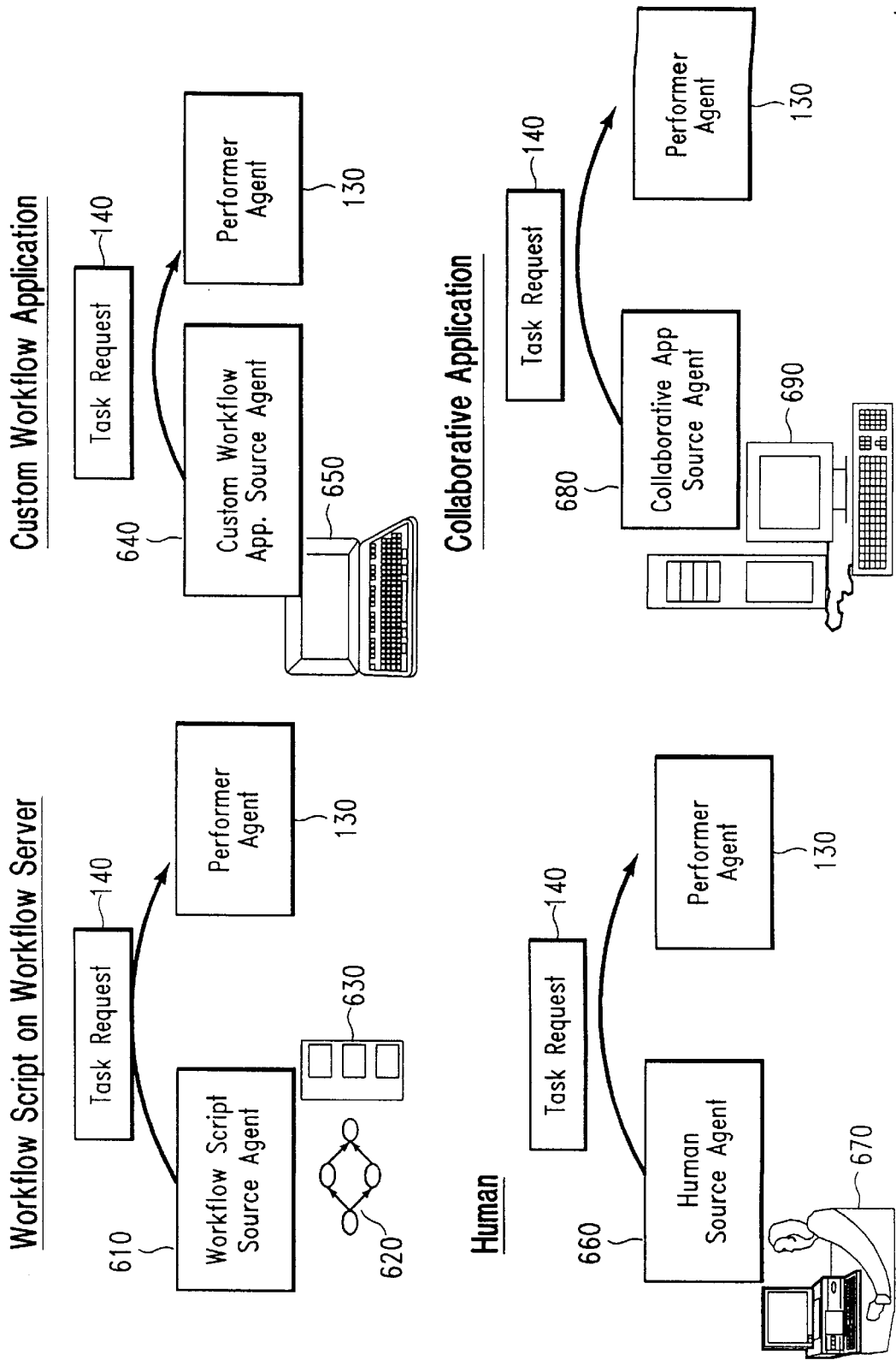
FIG. 6 shows different implementations of Source Agents that permit heterogeneous Sources to participate in the distributed workflow system.

Heterogeneous Sources 100 can be supported by the present invention, as shown in FIG. 6. A preferred embodiment of the present invention includes Sources 100 that are workflow scripts 620 executing on workflow execution environments 630, custom workflow programs 640 executing on computer systems 650, humans 670, and collaborative applications 680 executing on computer systems 690. Corresponding Source Agents are Workflow Script Source Agent 610, Custom Workflow Source Agent 640, Human Source Agent 660, and Collaborative Application Source Agent 680. Source Agents can be created for arbitrary Activity generation algorithms, or Sources. Even a workflow script 620 could be a control-flow process graph, or it could be a set of declarative rules.

Performers and Performer Agents

Figure 7:
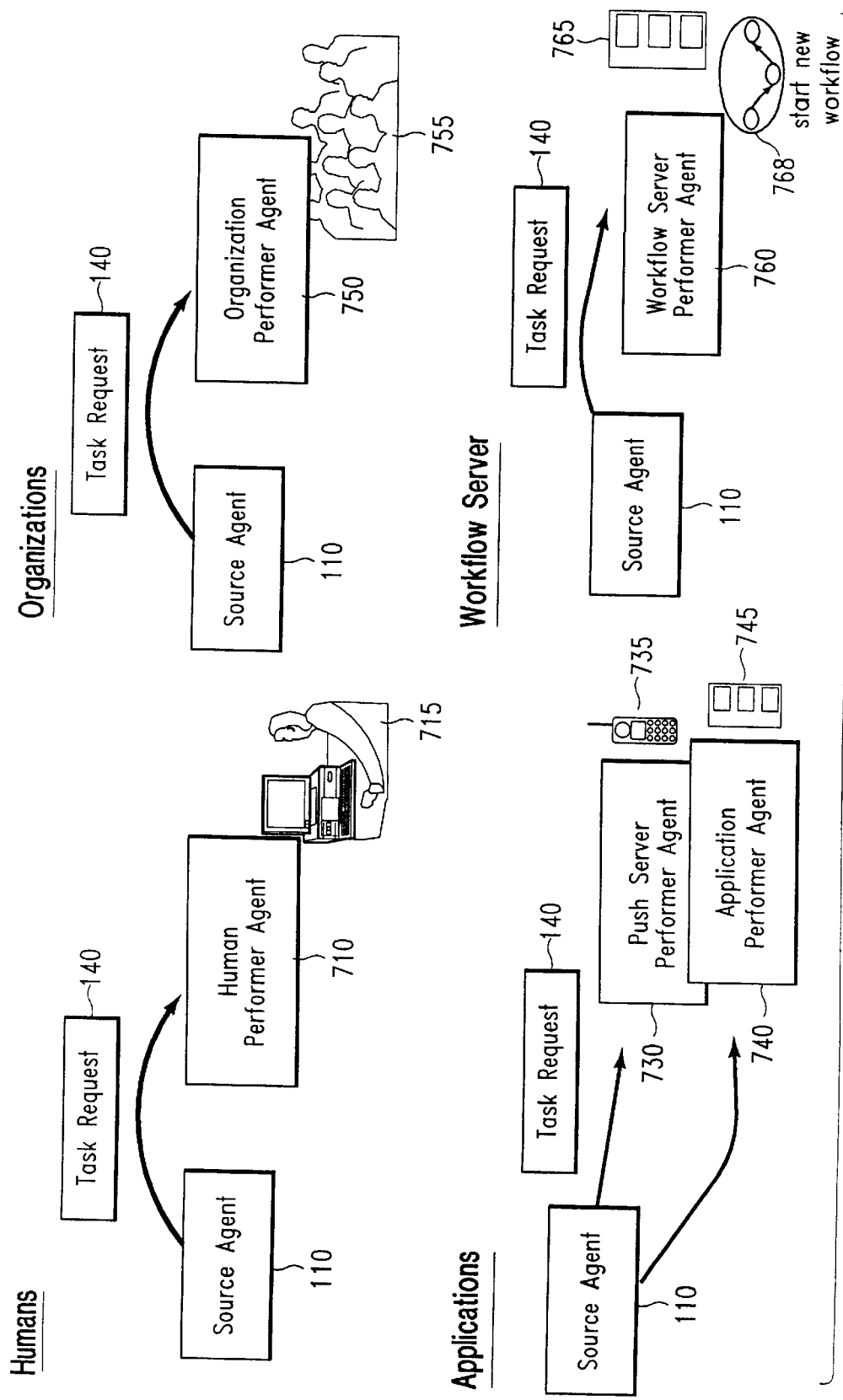
FIG. 7 shows different implementations of Performer Agents that permit heterogeneous Performers to participate in the distributed workflow system.

Heterogeneous Performers 120 can be supported by the present invention, as shown in FIG. 7. A preferred embodiment of the present invention includes Performers 120 that are humans 715, computer applications 745, push clients such as Personal Digital Assistants 735, organizations 755, and workflow servers 765. Corresponding Performer Agents are Human Performer Agent 710, Application Performer Agent 740, Push Server Performer Agent 730, Organization Performer Agent 750, and Workflow Server Performer Agent 760.

FIGS. 8A, 8B, 8C, 9, 10, and 11 describe the wide range of interactions between Performer Agents and Performers achieved by the present invention.

Performer Agents as Worklists

Figure 8A:
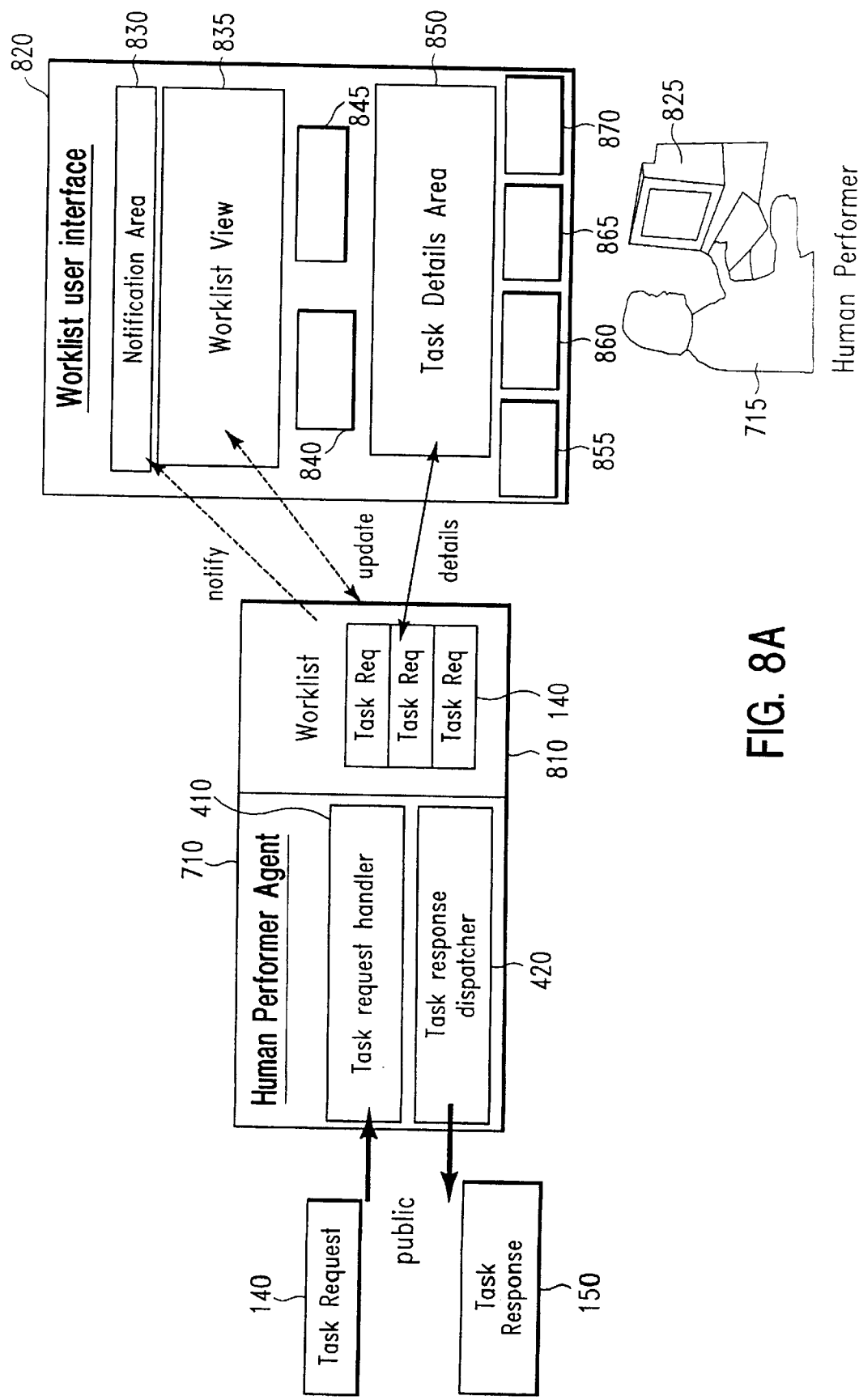
FIG. 8A shows how a Performer Agent can act as a Worklist for a human Performer.

FIG. 8A describes a preferred embodiment of the Human Performer Agent 710. In addition to the standard Performer Agent design, the Human Performer Agent implements a Worklist 810 (or inbox), where it queues the incoming Task Requests 140 for the Performer. Using a Worklist user interface program 820 possibly running on a different computer system 825, a human Performer 715 can inspect, download, and interact with Task Requests queued on its Worklist 810 by pulling them. In a preferred embodiment, the Worklist 810 and the Worklist user interface 820 are separated by a network 825, even though it is possible in a different embodiment for them to be on the same computer system. The Worklist user interface 820 acts as a 'pull' client application for the Worklist 810.

The Worklist user interface 820 contains:

a notification area 830 which is used by the Worklist 810 to notify the human Performer 715 of events such as the arrival of a new Task Requests 140.

a worklist view area 835 where the contents of the Worklist 810 are displayed.

a button or other way 840 for the human Performer 715 to ask for a refresh of the contents of the worklist view area 835.

a button or other way 845 for the human Performer 715 to ask for the details of a specific Task Request 140 selected from the worklist view area 835.

a task details area 850 where the details of a specific Task Request 140 is shown at any time.

buttons or ways to start 855, complete 860, refuse 865, or forward 870 the currently selected Task Request 140 shown in the task details are 850.

In a preferred embodiment, the Worklist user interface 820 is implemented as a portable applet written in the Java programming language that can be downloaded and executed within a Web browser that contains an embedded Java Virtual Machine and support for Remote Method Invocation; in this case HotJava 1.0 from Javasoft, Inc.

Figure 8B:
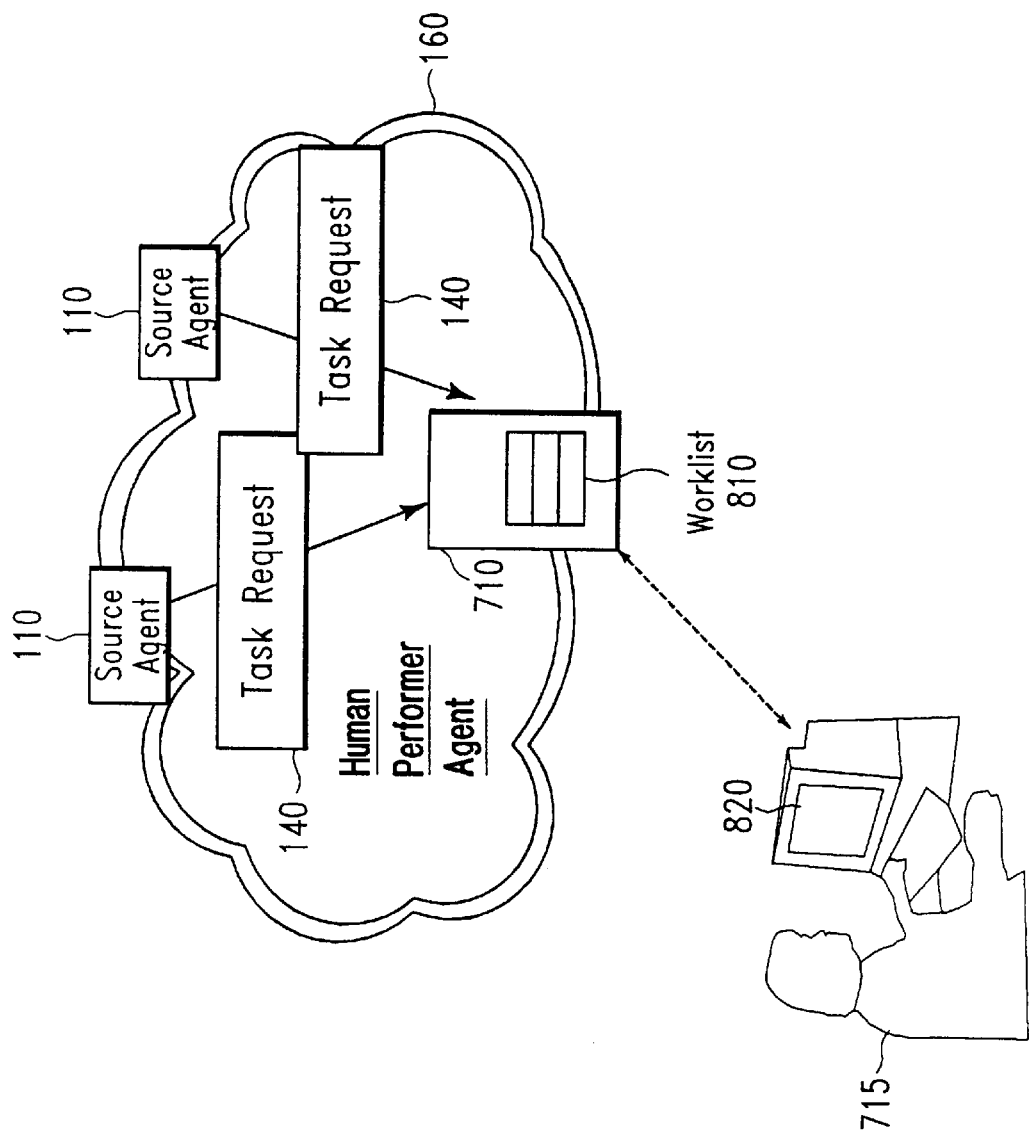
FIG. 8B shows how a Performer Agent that acts as a Worklist allows a human Performer to be addressed by multiple, heterogeneous Sources.

Worklists 810 and Worklist user interfaces 820 offer a traditional metaphor for pulling work in workflow systems. However, the vital distinction in the present invention from current workflow systems is that the Worklist 810 is addressable as a human Performer Agent 710 and is outside the scope of the Source 100 and Source Agent 110. This allows different Source Agents 110 to send Task Requests 140 to a human via a single Worklist 810, as shown in FIG. 8B. a single Worklist 810 and its human owner 715 is thus shareable across multiple workflow systems.

Figure 8C:
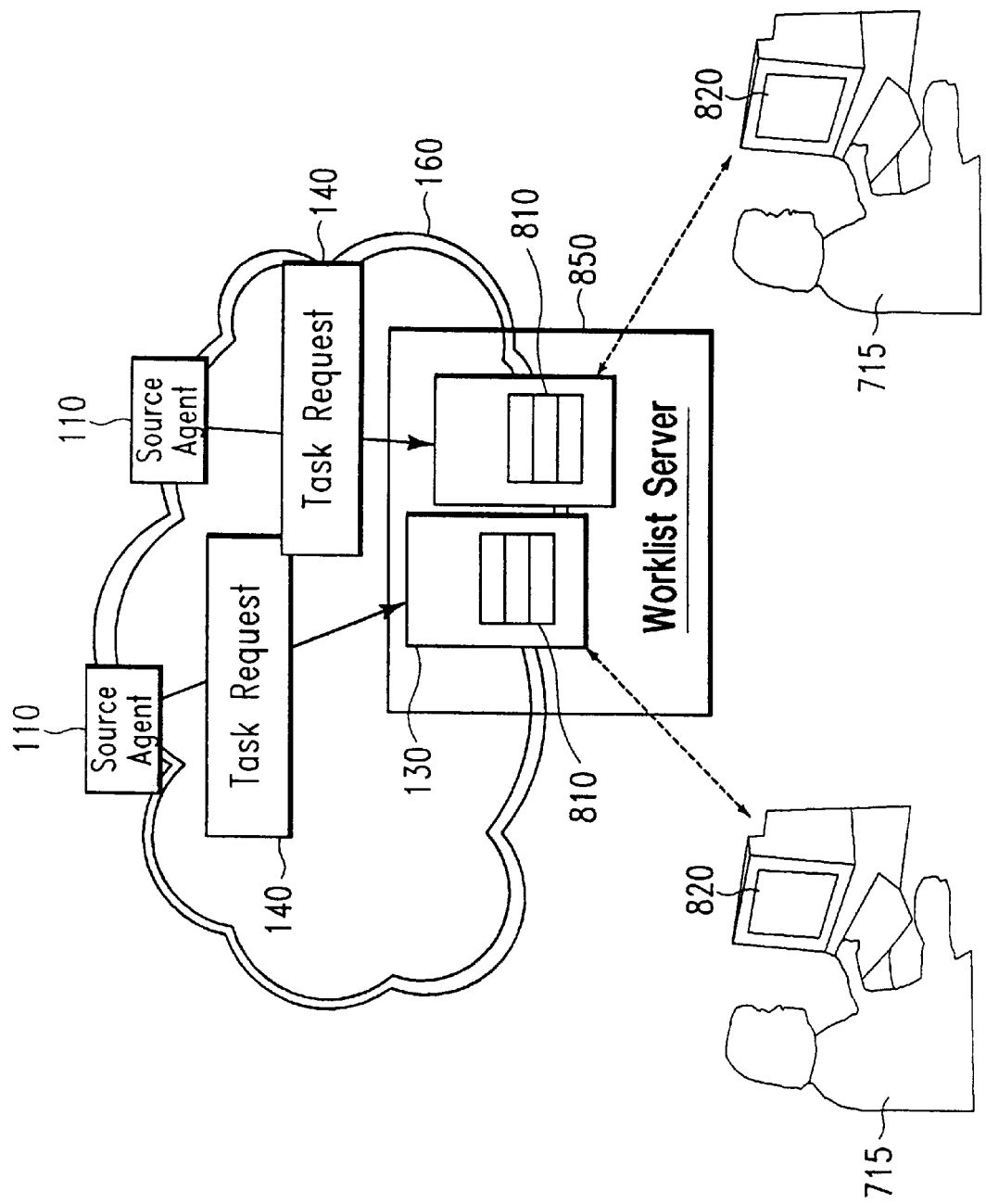
FIG. 8C shows how Performer Agents that act as Worklists can be managed on the network via dedicated Worklist Servers, which are outside the scope of the Sources.

Finally, Worklists 810 are managed on the network by a Worklist Server 850, which resides on the network 160 and is responsible for creating and hosting Worklists 810 on behalf of human Performers 715, as shown in FIG. 8C. Multiple such Worklist Servers 850 can be deployed if the number of Worklists 810 grows very large.

Performer Agents as Clients to Server Applications

FIG. 9 shows how a Performer Agent implementation can act as a client 740 to a back-end server application. The Application Performer Agent 740 receives Task Requests 140 and responds to them by invoking services on a back-end Server Application 745 via its client component 920. On receiving the results from the Server Application 745, it constructs the appropriate Task Response message 150 and returns it to the requesting Source Agent 110.

This mechanism allows third-party application and program developers to plug in their components into a distributed workflow systems as 'workflow-aware' components, or Application Performers 745. This in turn makes it possible for Sources 100 on the network to utilize the services of these Application Performers 745.

Performer Agents as Push Servers

Figure 10:
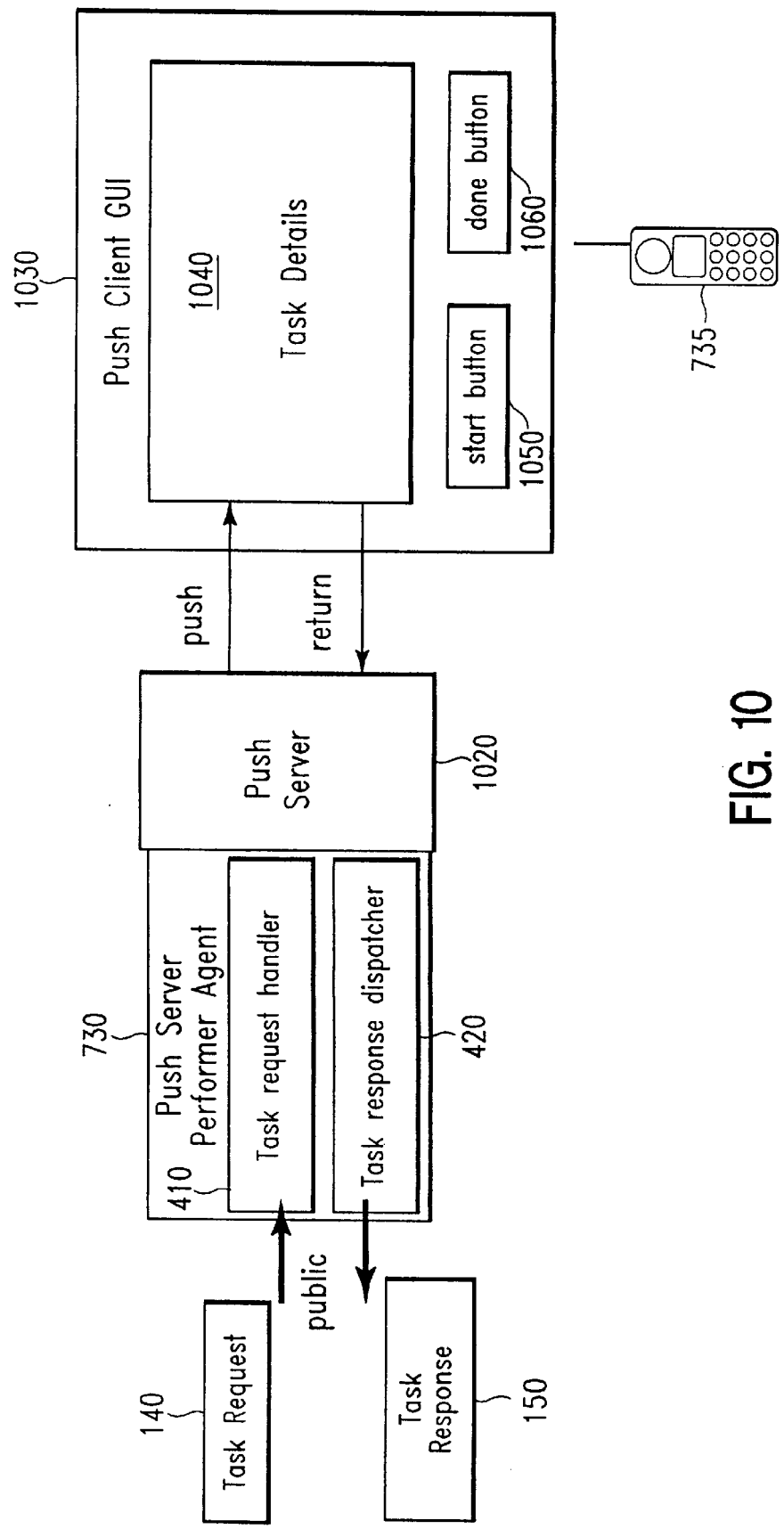
FIG. 10 shows how a Performer Agent can act as a Push Server to a Push Client such as a PDA (cell-phone, pager, etc).

FIG. 10 shows how a Performer Agent implementation can act as a Push Server 730. On receiving a new Task Request 140, the Task Request Handler 410 checks to see if the Push Client 1030 is currently connected and available. If it is, the Push Server component 1020 is invoked to push the Task Request to the Push Client 1030. The Push Client 1020 user interface contains a task details area 1040 where the Task Request 140 is displayed. The start 1050 and done 1060 buttons on the Push Client 1020 allows the Performer to interact with the Task Request and return the results to the Push Server Performer Agent 730.

The Push Server Performer Agent 730 is a useful mechanism for incorporating lightweight, portable devices such as Personal Digital Assistants 735 (Cellular phones, pagers, etc.) as clients to workflow systems. Traditionally, these devices have not been used in workflow operation. Each of these devices may involve specific policies of how and under what conditions Task Requests are pushed to the Push Client 1030. However, all these policies can be subsumed within the implementation of specific Push Server Performer Agents.

Performer Agents as Gateways to Workflow Servers

Figure 11:
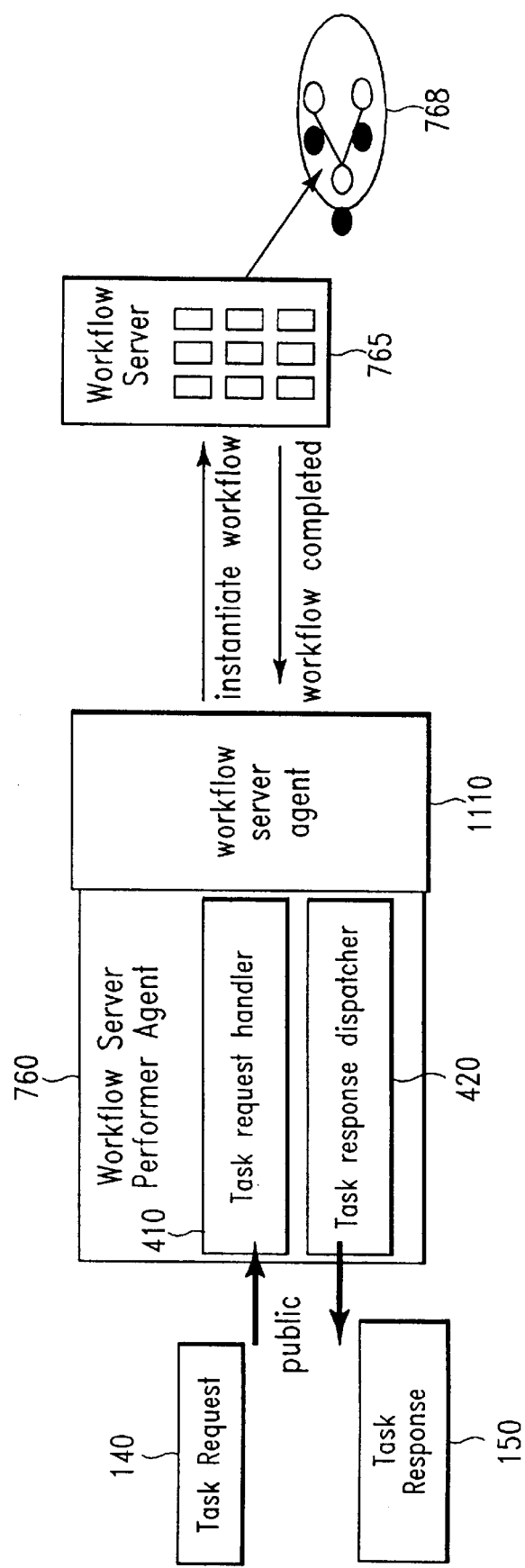
FIG. 11 shows how a Performer Agent can represent a workflow server, via which requests for executing workflow scripts can be sent to the workflow server.

FIG. 11 shows an implementation of Performer Agent called Workflow Server Performer Agent 760 that acts as a gateway to a Workflow server 765. On receiving a Task Request 140, the Task Request Handler 410 forwards it to the Workflow Server agent 1110, which is responsible for instantiating a new instance of a workflow script 768 on the workflow server. On completion of the execution, the results of the workflow execution are returned to the Workflow Server Performer Agent 760 which then returns a Task Response 150 to the requesting Source Agent 110. Note that in this case the Workflow script 768 is a special kind of Task 260.

The present invention enables peer-to-peer workflow operation between workflow systems and components. In a preferred embodiment, this is achieved by the modeling of appropriate workflow entities as Source Agents 110 and Performer Agents 130. Peer-to-peer workflow operation differs from the traditional centralized workflow execution model since it allows autonomous and independent workflow systems and components to interoperate seamlessly using a distributed workflow execution model.

Communicating Workflow Servers

Figure 12:
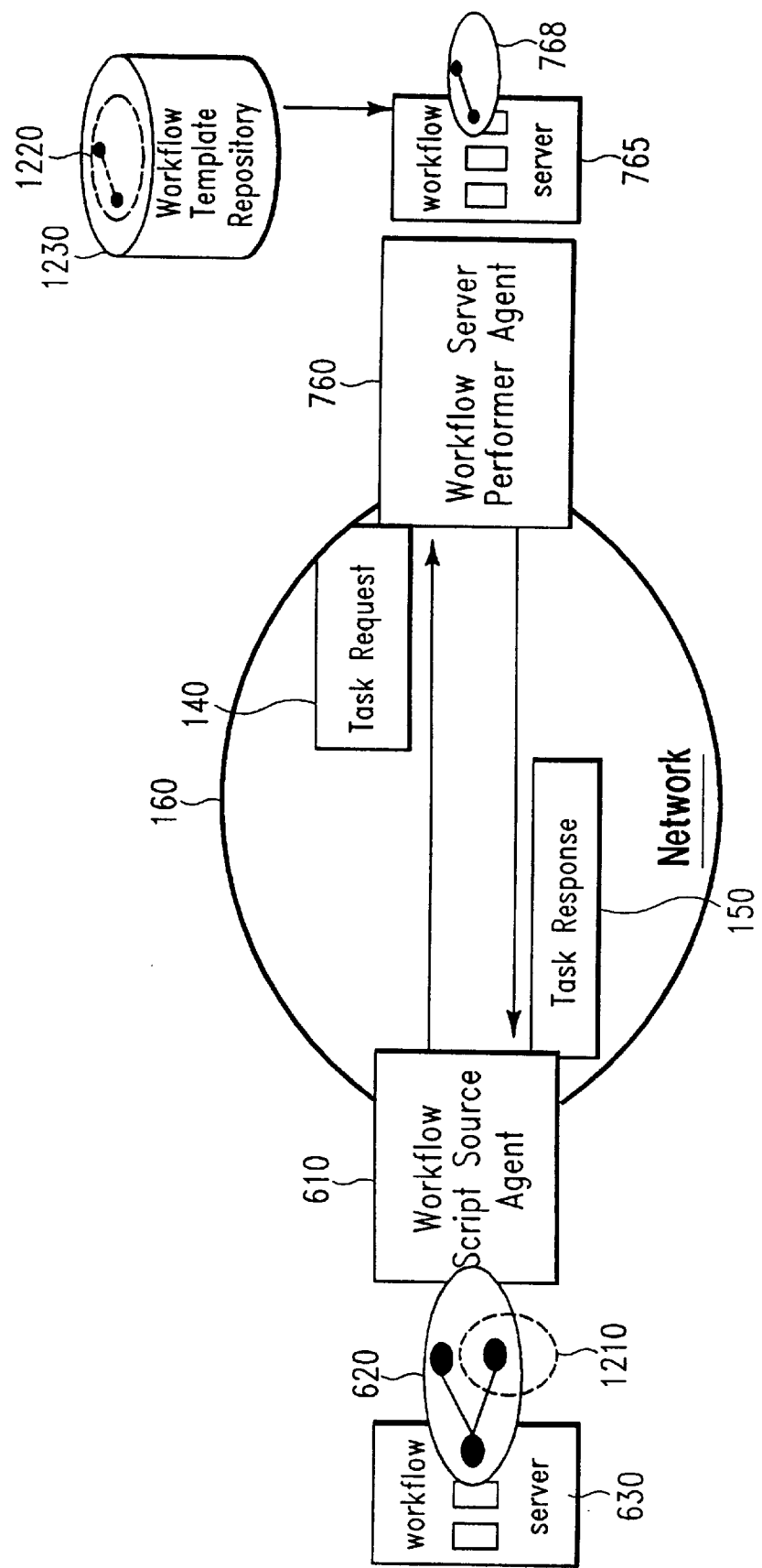
FIG. 12 shows how a Workflow Script Source Agent and a Workflow Server Performer Agent interact in a peer-to-peer fashion so that a parent workflow script of one Workflow Server can request the execution of a pre-installed subworkflow script in another Workflow Server.

According to the present invention, two autonomous, heterogeneous workflow systems or servers can interact by instantiating workflow scripts on each other. In FIG. 12, a parent workflow script 620 executing on a workflow server 630 may contain a child workflow or subworkflow 1210 whose script 1220 resides in the workflow template repository 1230 of a remote workflow server 765. To execute the subworkflow 1210, the present invention uses a Workflow Script Source Agent 610 to act as a proxy for the parent workflow script 620, and a Workflow Server Performer Agent 760 to act as a proxy for the remote workflow server 765. When the parent workflow script 620 is ready to execute the subworkflow 1210, it uses its Workflow Script Source Agent 610 to send a Task Request 140 to the Workflow Server Performer Agent 760, requesting an execution of the workflow script 1220 (usually indicated by a Process Type identifier). On receiving this request, the remote workflow server 765 looks up its local workflow template repository 1230 and creates and executes a local instance 768 of the workflow script 1220. When the workflow script 768 completes, the Workflow Server Performer Agent 760 is used to return the results to the Workflow Script Source Agent 610 via a Task Response message 150.

Downloadable Workflow Scripts

Figure 13A:
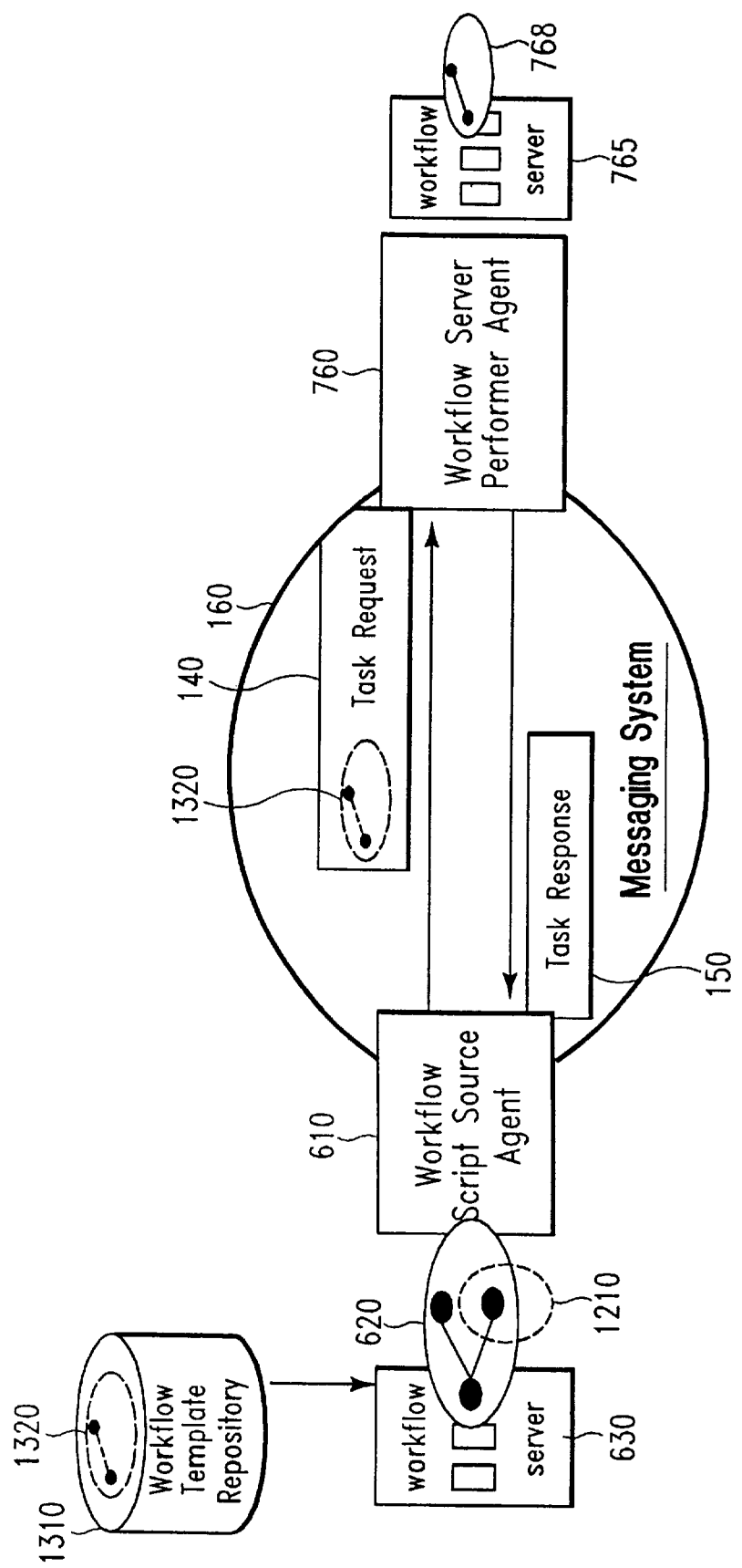
FIG. 13A shows how a Workflow Script Source Agent and a Workflow Server Performer Agent interact in a peer-to-peer fashion so that a parent workflow script of one Workflow Server can download the template of a subworkflow script to another server and have it executed.

According to the present invention, an autonomous workflow system or server can interact with another autonomous system or server by downloading workflow scripts on the latter for execution. In FIG. 13A, a parent workflow script 620 executing on a workflow server 630 may contain a child workflow or subworkflow 1210 whose script 1320 resides in the local workflow template repository 1310. However, for reasons of efficiency, the workflow server 630 may choose to execute the subworkflow 1210 on a remote workflow server 765. To execute the subworkflow 1210, the present invention uses a Workflow Script Source Agent 610 to act as a proxy for the parent workflow script 620, and a Workflow Server Performer Agent 760 to act as a proxy for the remote workflow server 765. When the parent workflow script 620 is ready to execute the subworkflow 1210, it uses its Workflow Script Source Agent 610 to send a Task Request 140 to the Workflow Server Performer Agent 760. The Task Request 140 contains the workflow script template 1320, as well as the input parameters required to execute it. On receiving this request, the remote workflow server 765 creates and executes a local instance 768 of the workflow script 1320. When the workflow script 768 completes, the Workflow Server Performer Agent 760 is used to return the results to the Workflow Script Source Agent 610 via a Task Response message 150.

Note that while downloadable workflow scripts are very similar in nature to communicating workflows, the fundamental difference is that in the former, the workflow script template 1320 is sent to the remote server as part of the execution request, while in the latter, the workflow template 1220 resides locally in the workflow template repository 1230 of the remote workflow server 765.

Downloadable Workflow Execution Environments

Figure 13B:
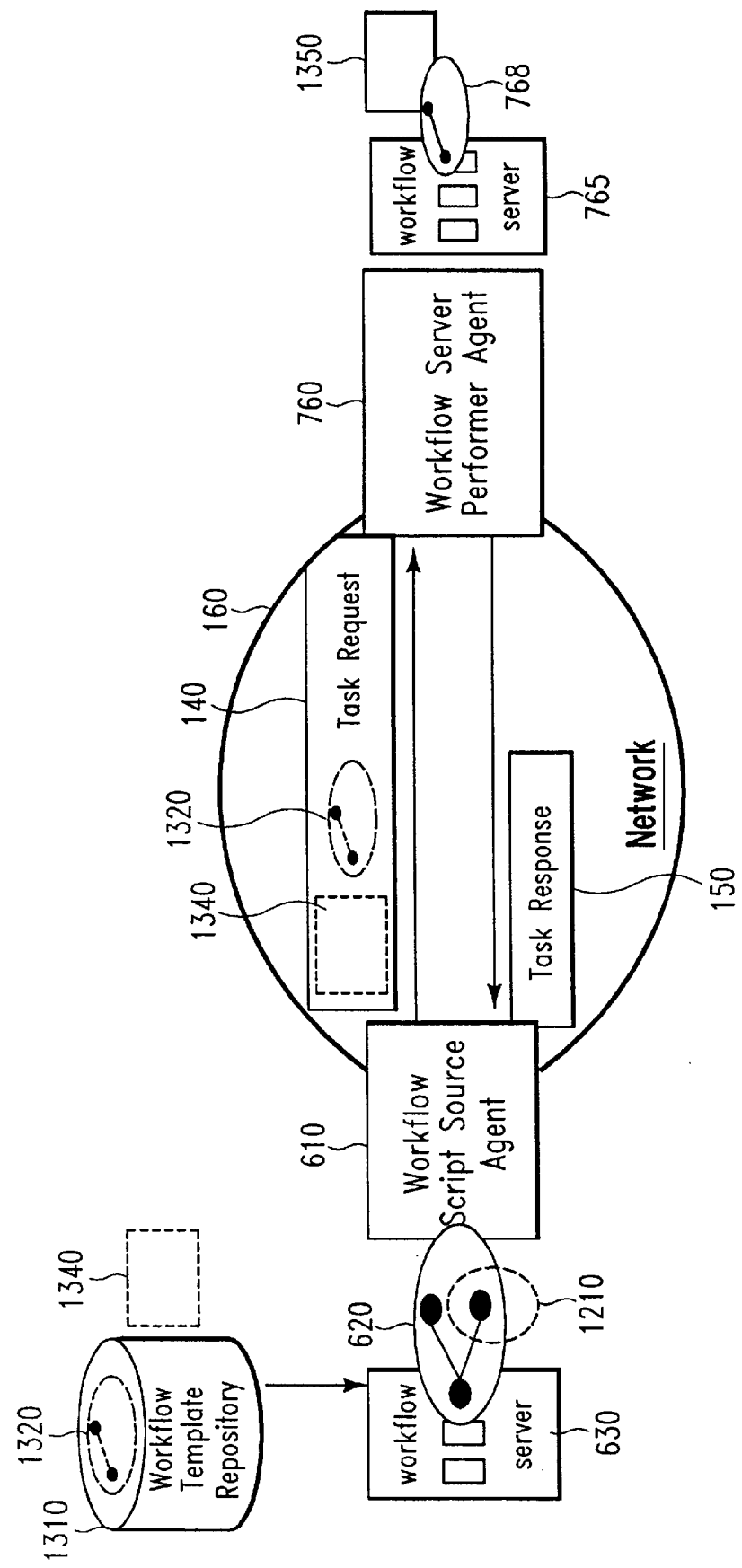
FIG. 13B shows how a Workflow Execution Environment to execute a workflow script can be downloaded along with the workflow script.

In a preferred embodiment of downloadable workflow scripts, the execution environments of the workflow server 630 and remote workflow server 765 are compatible. This allows the workflow script 1320 downloaded from workflow server 630 to execute correctly on the remote workflow server 765. However, this is not a limiting assumption. The workflow execution environments need not always be compatible, and such situations can be handled according to FIG. 13B.

In a situation where the remote workflow server 765 has an incompatible workflow execution environment, the Task Request 140 sent to the Workflow Server Performer Agent 760 containing the workflow script template 1320 may further contain a downloadable workflow execution environment 1340 for the workflow script template 1320 as well. The remote workflow server 765 must then install the downloaded workflow execution environment 1340 before executing an instance of the workflow script template 1320.

In a preferred embodiment, a downloadable workflow execution environment 1340 written in the Java programming language is used to download workflow execution to Performers that do not have a compatible workflow execution environment. The Performer installs the downloaded workflow execution environment as a local entity 1350 and then instantiates the workflow script with the input parameters as a local application 768 and passes it to the downloadable environment 1340 for execution, as shown in FIG. 13A.

The input parameters of the Task Request 140 message now contains three entities:
 The Portable Workflow Execution Environment 1340.
 The Workflow Script Template 1320.
 Input parameters to the Workflow Script 768.

Disconnected Operation

The present invention enables disconnected and occasionally connected workflow operation. In a preferred embodiment, this is achieved by introducing a mechanism for Sources to connect and disconnect from their Source Agents and Performers to connect and disconnect from their Performer Agents, without compromising the execution of the distributed workflow system.

Disconnected or Occasionally Connected Source

Figure 14:
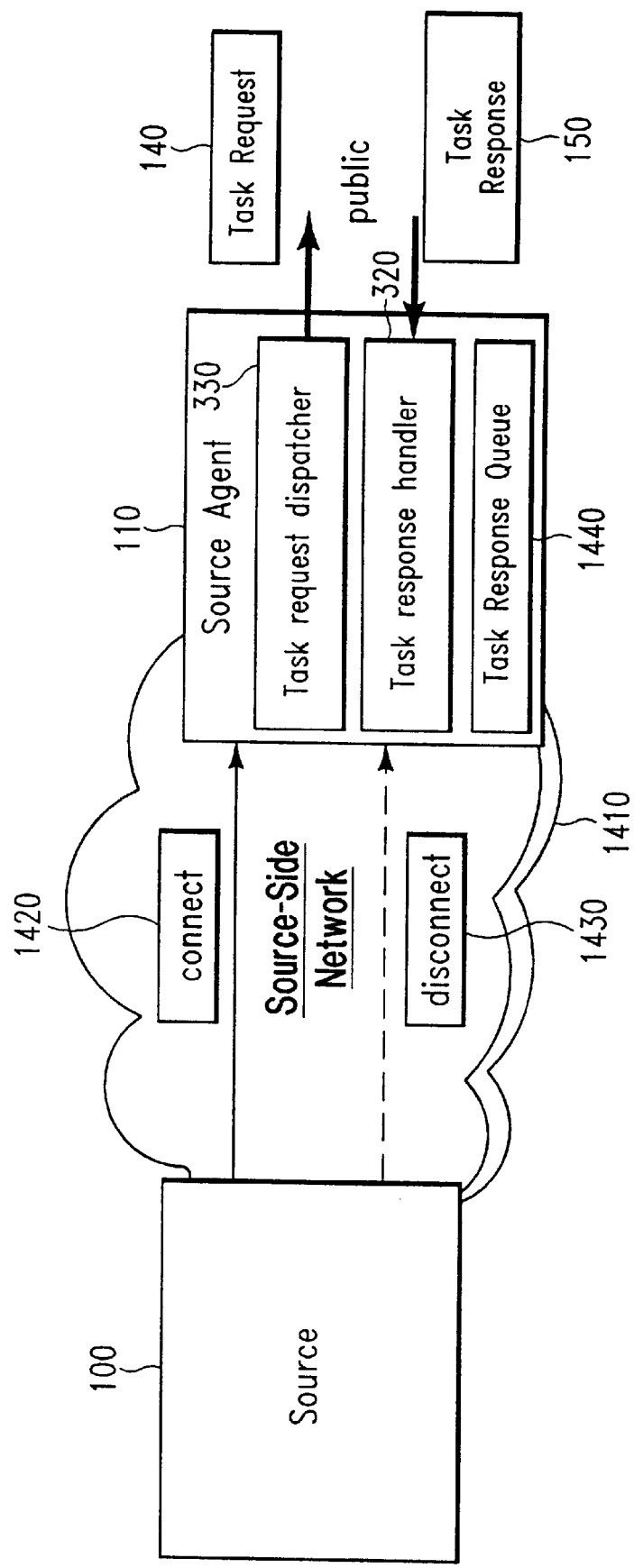
FIG. 14 shows how distributed workflow execution can continue even when a Source is disconnected from its Source Agent.

FIG. 14 shows the interactions between a Source 100 and its Source Agent 110 for the purposes of disconnected operation. A Source-side network 1410 exists (this is conceptually different from the main network 160 in FIG. 1) between the Source 100 and the Source Agent 110. The Source 100 can at any time send a connect request 1420 or disconnect request 1430 to its Source Agent 110 over the source-side network 1410 to connect to and disconnect from it respectively. Note that the Source Agent 110 always maintains a permanent connection 115 with the main network 160.

In a preferred embodiment, as long as the Source 100 and Source Agent 110 are connected, the standard interactions outlined in FIG. 3 can continue. However, when the Source 100 is disconnected, the Task Response Handler 320 in the Source Agent 110 must queue the incoming Task Responses 150 in a Task Response Queue 1440 component. This mechanism provides the necessary transparency to the Performer Agents 130, which do not need to know that the Source 100 is disconnected, and can thus continue to respond. When the Source 100 reconnects to the Source Agent 110, the Task Response Handler 320 is responsible for returning the queued Task Responses 150 to the Source 100 in the form of Activity Service Responses 220 (as shown in FIG. 3). A preferred embodiment uses a first-in-first-out queuing policy to return responses to the Source 100. Different policies such as sorting Task Responses 150 by priority or deadlines may be used by alternate embodiments.

Disconnected or Occasionally Connected Performer

Figure 15:
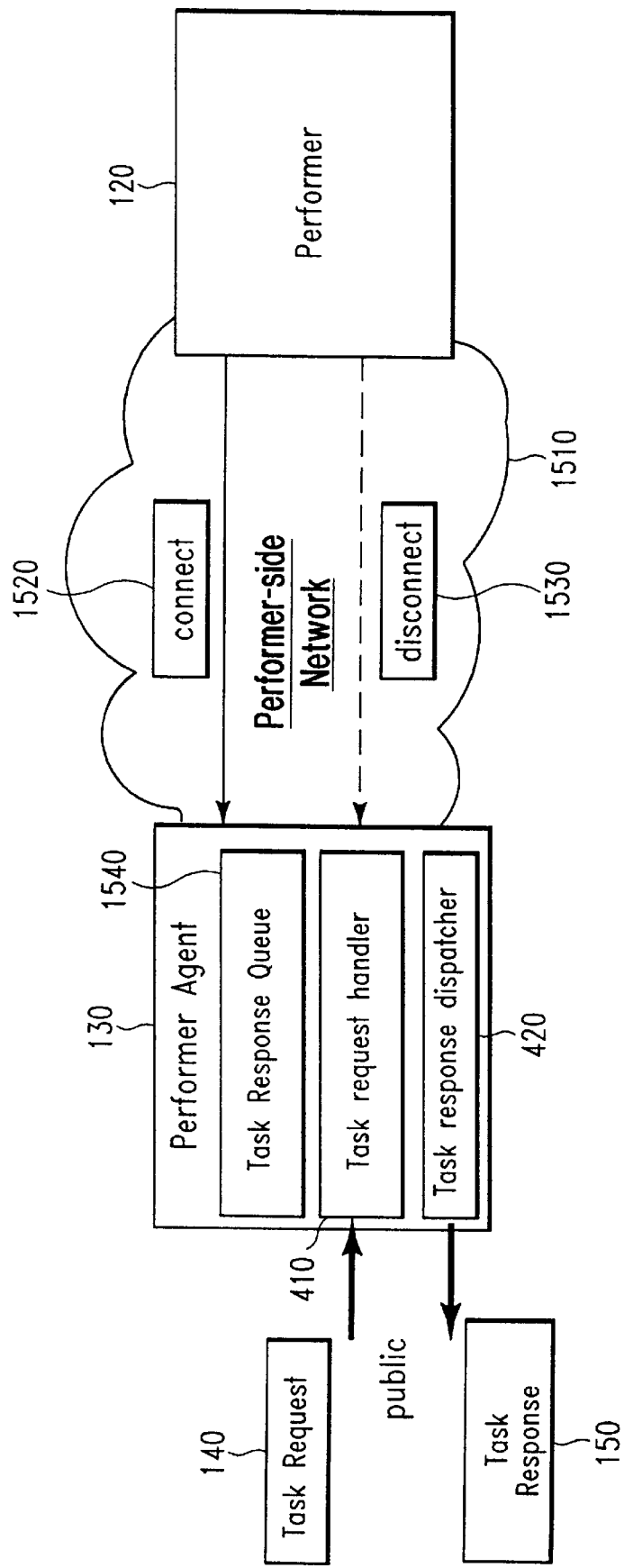
FIG. 15 shows how distributed workflow execution can continue even when a Performer is disconnected from its Performer Agent.

FIG. 15 shows the interactions between a Performer 120 and its Performer Agent 130 for the purposes of disconnected operation. a Performer-side network 1510 exists (this is conceptually different from the main network 160 in FIG. 1) between the Performer 120 and the Performer Agent 130. The Performer 120 can at any time send a connect request 1520 or disconnect request 1530 to its Performer Agent 130 over the performer-side network 1510 to connect to and disconnect from it respectively. Note that the Performer Agent 130 maintains a permanent connection 135 with the main network 160, as shown in FIG. 1.

In a preferred embodiment, as long as the Performer 120 and Performer Agent 130 are connected, the standard interactions outlined in FIG. 4 can continue. However, when the Performer 120 is disconnected, the Task Request Handler 410 in the Performer Agent 130 must queue the incoming Task Requests 140 in a Task Request Queue 1540 component. This mechanism provides the necessary transparency to the Source Agents 110, which do not need to know whether the Performer 120 is disconnected, and can thus continue to send requests. When the Performer 120 reconnects to the Performer Agent 130, the Task Request Handler 410 is responsible for forwarding the queued Task Requests 140 to the Performer 120 in the form of Task Service Requests 240 (as shown in FIG. 4). A preferred embodiment uses a first-in-first-out queuing policy to forward requests to the Performer 120. Different policies such as sorting Task Requests 140 by priority or deadlines may be used by alternate embodiments.

Other Features

In addition, the present invention contains a number of other valuable features.

Groups/Roles

Group and Role management is an important part of workflow system design. Workflow servers use the concept of roles to assign work to more than one participant simultaneously, either to achieve improved process throughput or because the semantics of the Activity requires it. For example, a workflow system may use the role MANAGER to distribute work to multiple managers simultaneously. In a traditional system, such role resolution is performed by the workflow server.

Figure 16:
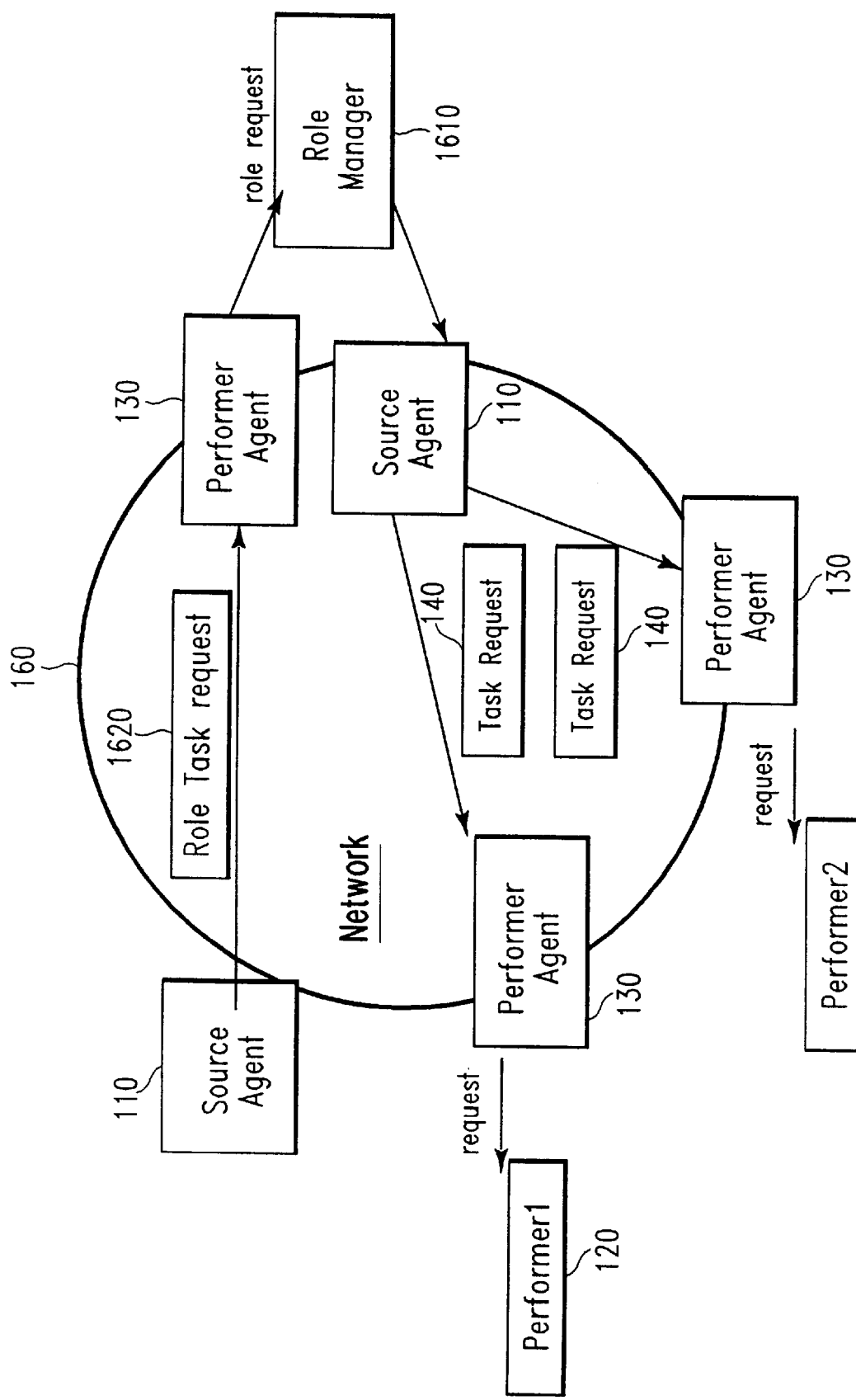
FIG. 16 shows how group and role managers can be implemented in a distributed workflow system using Performer Agents and Source Agents.

In the present invention, Groups and Roles are managed by special-purpose Performers, as shown in FIG. 16. A Source Agent 110 sends a Role Task Request 1620 to the Performer Agent 130 of a Role Manager 1610. The Role Manager 1610 decides the current membership of the Role, in this case Performers 1 and 2. It then uses a Source Agent 110 of its own to forward the exact Task Requests 140 to the appropriate Performer Agents 130. This mechanism of the present invention allows for the separation of Role management from workflow execution and is beneficial for distributed workflow execution, and late-binding of Performers to Roles.

Forwarding by Performers

Figure 17:
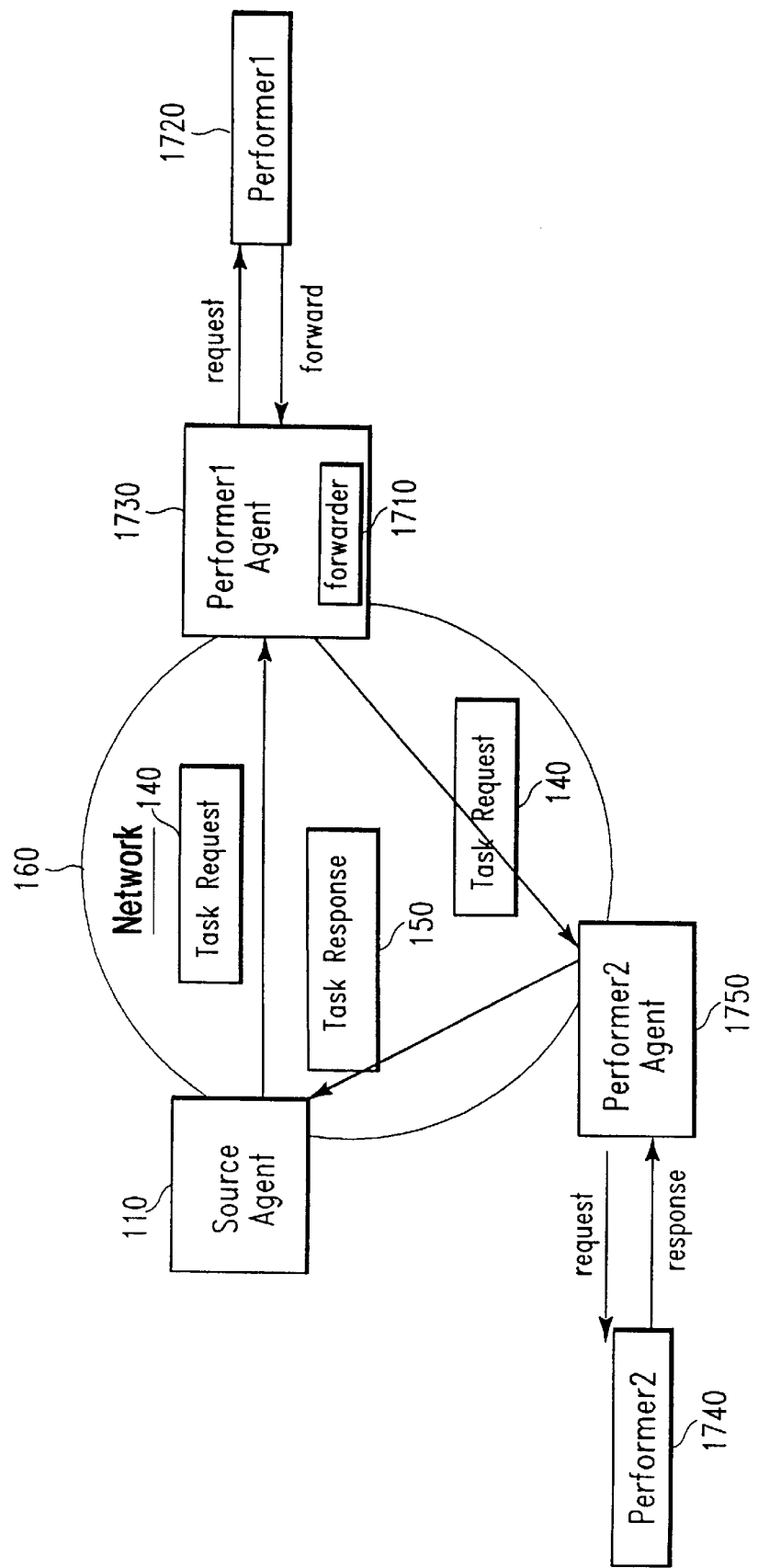
FIG. 17 shows how a Task Request sent to a Performer Agent can be forwarded to other Performer Agents for execution.

Forwarding of Task Requests from one Performer to another is supported by the present invention. This is beneficial when the initial Performer selected by the Source is not qualified to perform the Task. FIG. 17 shows how a Task Request 140 initially sent to Performer1 1720 is forwarded by Performer Agent 1730 to Performer2 1740 via Performer2 Agent 1750. The forwarding is achieved by the forwarder component 1710 within the Performer Agent 1730. The Task Response 150 generated by Performer2 Agent 1750 is sent directly back to the Source Agent 110. Note that this feature enables the forward button 870 in FIG. 8A.

Sharing Source Agents

FIG. 6 shows how a Workflow Script 620 executing on a Workflow Server 630 is represented by a Workflow Script Source Agent 610. Since a typical workflow server can have many workflow scripts executing in parallel, a dedicated Workflow Script Source Agent 610 for each of the scripts could lead to a very large number of Workflow Script Source Agent entities. This is inefficient.

Figure 18:
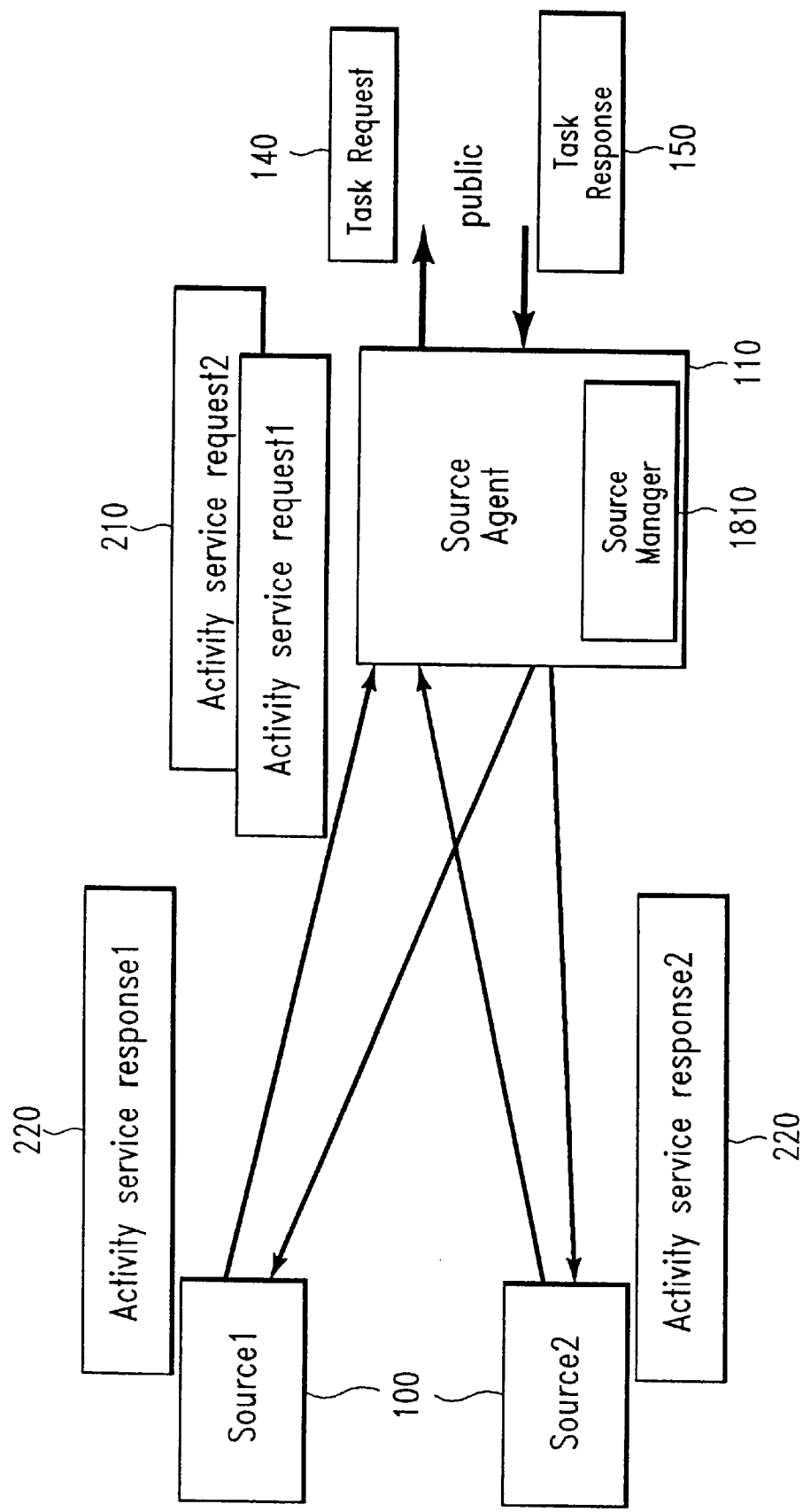
FIG. 18 shows how multiple Source entities can share the services of a single Source Agent.

The present invention allows multiple Sources 100 to share the services of a single Source Agent 110. FIG. 18 shows how Source1 and Source2 send Activity Service Requests 210 to a shared Source Agent 1810. The Source Agent 110 generates the usual Task Requests 140 in both cases. On receiving the Task Responses 150, the Source Agent 110 has to distinguish between the response for Source1 and the response for Source2. In a preferred embodiment, this is done by an internal tracking mechanism called a Source Manager 1810. The Source Manager maintains a list of Source identifiers that are sharing its services. For each outgoing Task Request 140, the Source Manager adds the Source identifier as a prefix to the Activity ID issued by the Source. When a Task Response 150 arrives, the Source Manager strips out the prefix from the Activity ID to determine the exact Source, and returns the original Activity ID as part of the Activity Service Response message 220.

An alternative embodiment would maintain a record of the Activity ID of each outgoing Task Request message 140 and the identifier of the original Source 100 that issued the Activity Service Request 210. When a Task Response 150 arrives, the Activity ID in the Task Response 150 can be used by the Source Manager 1810 to locate the Source 100 that issued the request. Note that this mechanism assumes that each Activity ID is unique across Sources.

Shared Worklists

Figure 19:
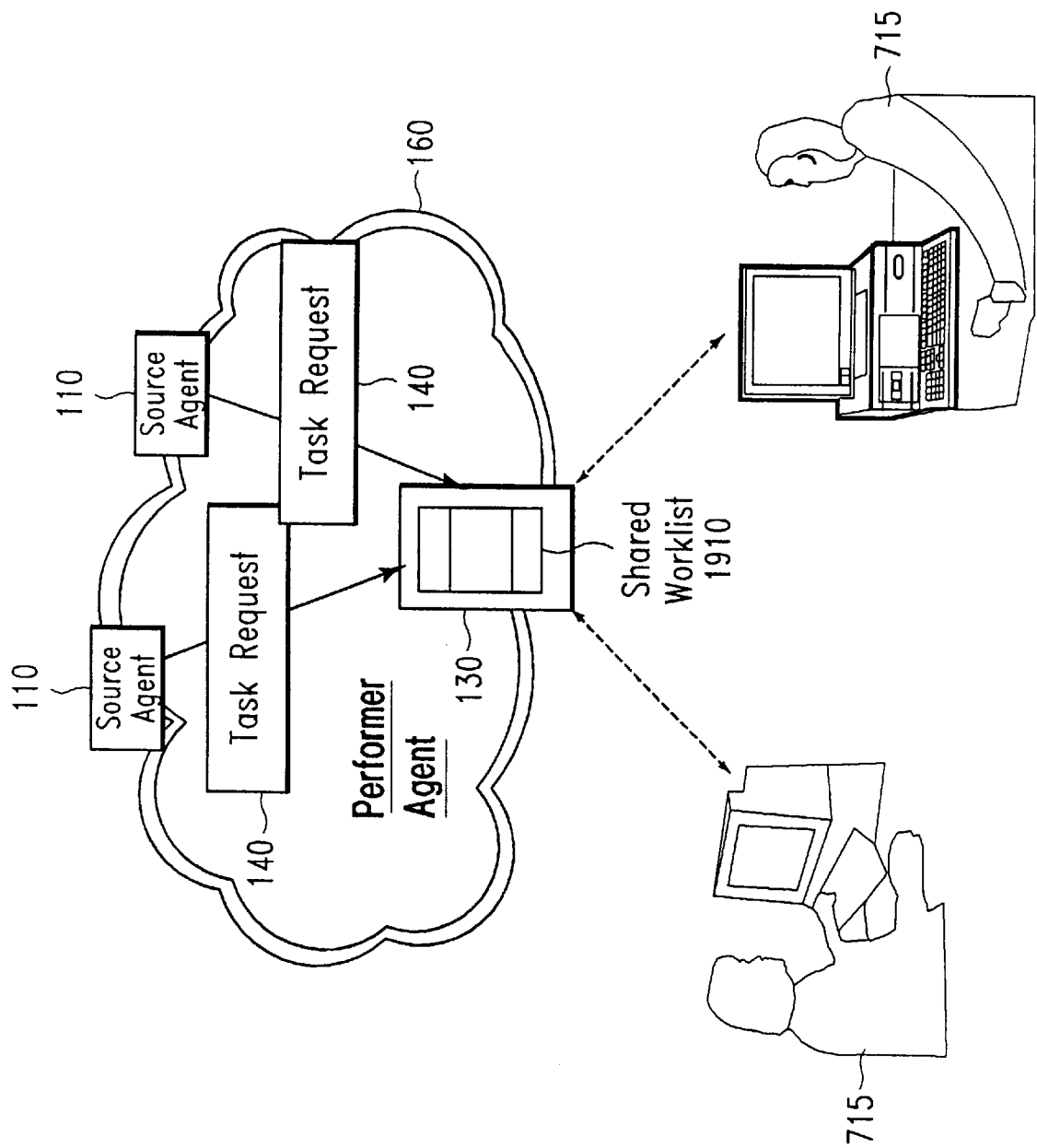
FIG. 19 shows how a Performer Agent can act as a Shared Worklist that can be accessed by multiple Performers.

FIG. 19 shows how the present invention supports shared worklists or work spaces for collaboration or other purposes. Two different human Performers 715 have access to a shared worklist 1910, which is a Performer Agent 130 that receives Task Requests 140 from multiple Source Agents 110. Both Performers have access to the contents of the shared Worklist. In a preferred embodiment, either Performer can respond to a Task Request 140. Once a Task Request has been picked up by a Performer, the Worklist prevents the other Performer from starting it.

Directory Service

Figure 20:
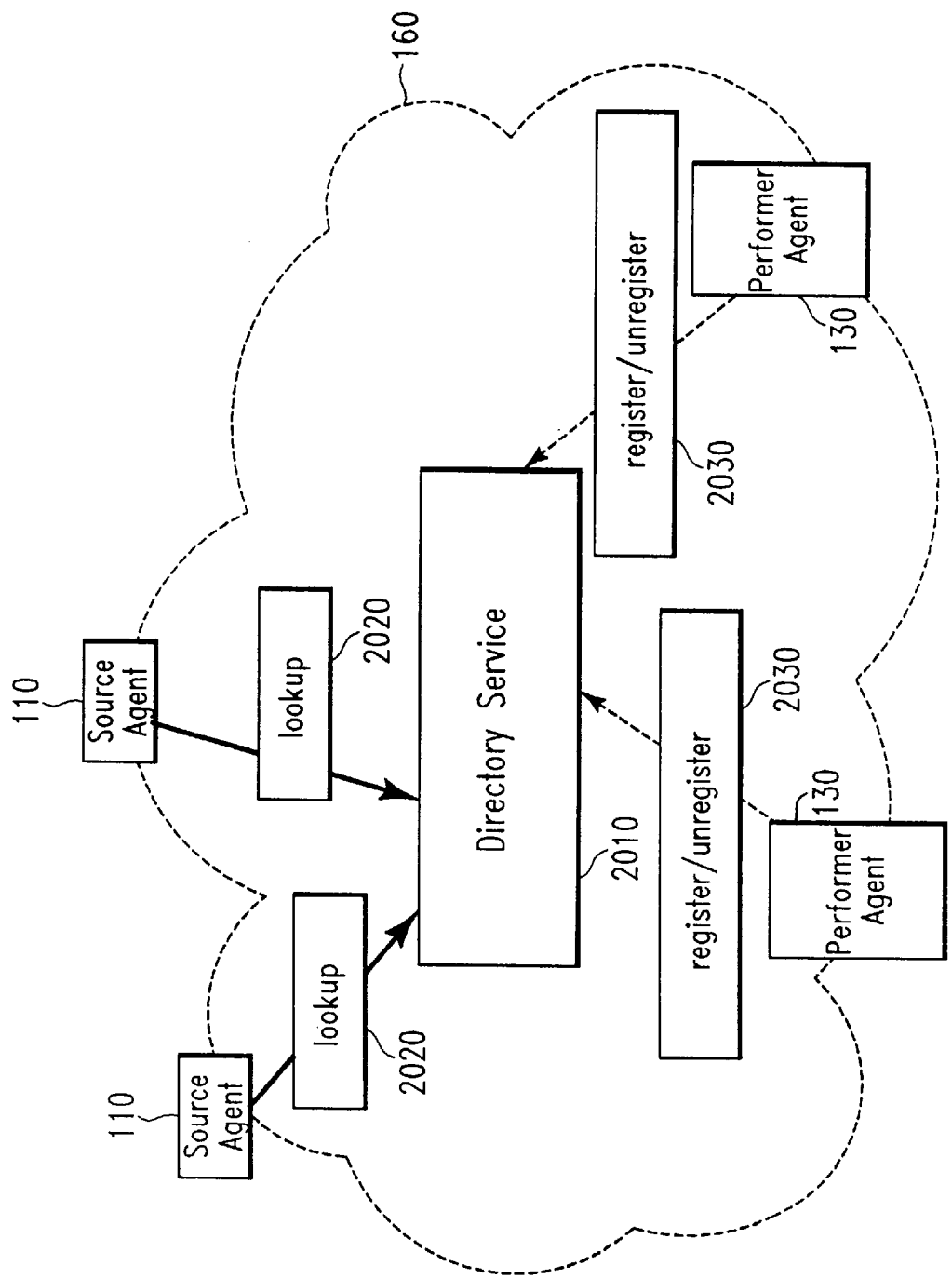
FIG. 20 shows how to locate Performer Agents on the network via a directory service.

The present invention provides a mechanism for locating Performer Agents 130 on the network 160. This is achieved via a directory service 2010 shown in FIG. 20. The directory service 2010 contains advertised information about Performer Agents 130 on the network 160 and the Tasks 260 they can perform. Performer Agents 130 can register or unregister themselves with the directory service 2010 by sending register/unregister messages 2030. When a Source 100 needs to post a Task Request to a Performer, it first performs a lookup operation 2020 on the directory service to locate the appropriate Performer Agent on the network. In a preferred embodiment, the directory service is distributed program written in the Java programming language.

Network Types

The present invention defines a network 160 that allows Source Agents 110 and Performer Agents 130 to always communicate with each other. In a preferred embodiment, the network 160 is a token-ring local area network (LAN) running the TCP/IP (Transmission Control Protocol/Internet Protocol) protocol. The communication infrastructure used is the Remote Method Invocation mechanism of the Java programming language from Javasoft Inc. Alternate embodiments of the network 160 may be wide area networks (WAN), wireless networks, Intranets, Extranets, and the Internet; and the communication infrastructure may be electronic mail, TCP/IP sockets, RPC (Remote Procedure Calls), HTTP (Hyper Text Transfer Protocol), IIOP (Internet Inter Orb Protocol), and so forth.

For disconnected operation of Sources and Performers, the present invention defines a Source-side network 1410 and a Performer-side network 1510. In a preferred embodiment, both the networks are a token-ring local area network running the TCP/IP protocol. The communication infrastructure used is the Remote Method Invocation mechanism of the Java programming language from Javasoft Inc. Alternate embodiments of the networks may be wide area networks (WAN), wireless Intranets, Extranets, and the Internet; and the communication infrastructure may be electronic mail, TCP/IP sockets, Remote Procedure Calls, HTTP, IIOP, and so forth.

Workflow Specification Environment

Figure 21:
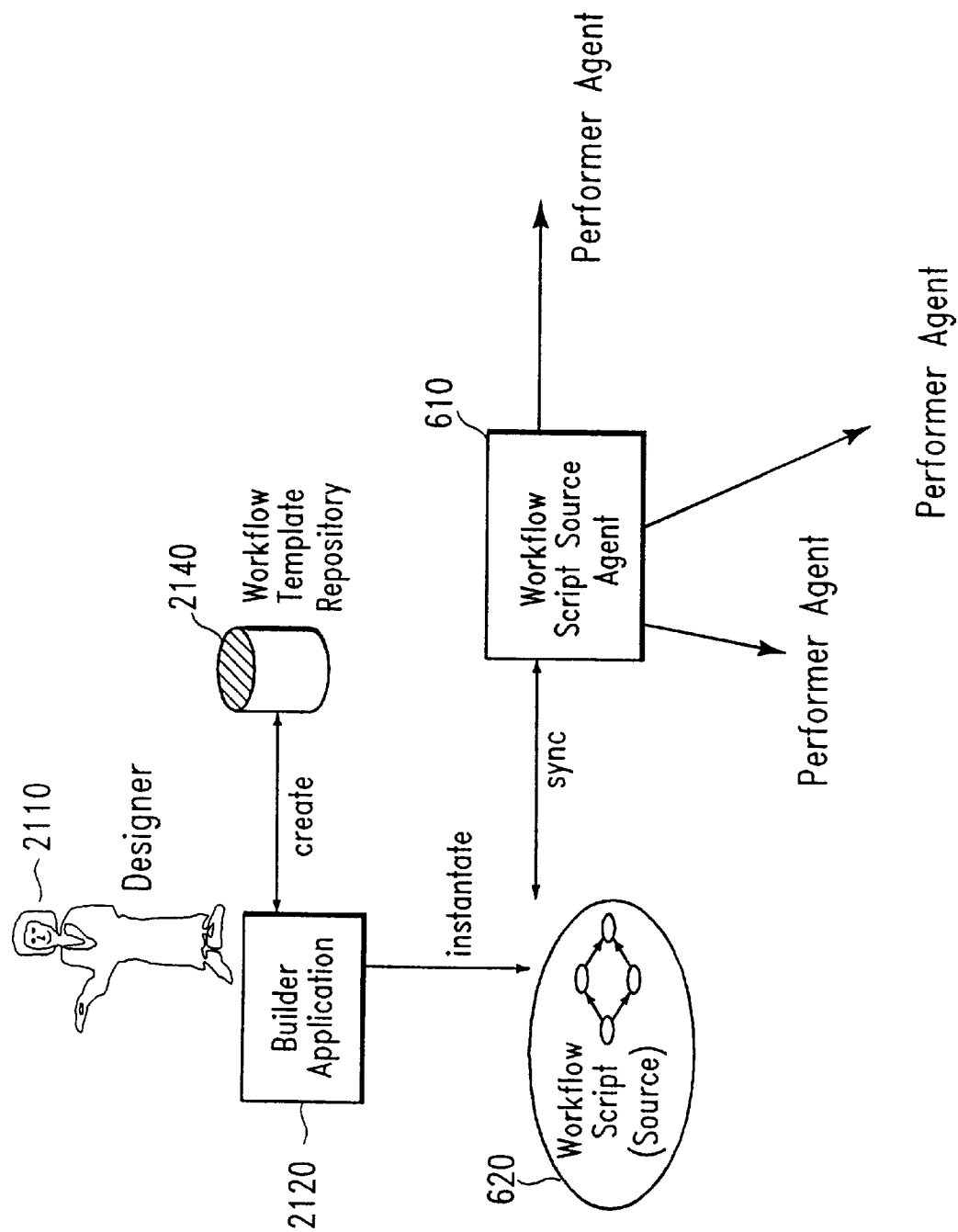
FIG. 21 shows a Workflow Specification Environment for Workflow Scripts.

FIG. 21 demonstrates how a human Workflow Designer 2110 uses a Builder 2120, a computer program with a graphical user interface, to design new Workflow script templates. The templates are stored in a Workflow Template Repository 2140. At any future time, a template can be instantiated to obtain an executing Workflow script, or a Source 620. The Source is associated with a Workflow Script Source Agent 610.

In a preferred embodiment, the Builder 2120 is written as an applet using the Java programming language. The Workflow Template Repository 2140 resides on the file system of a computer system on which the Builder 2120 executes. The workflow script Source 620 is a Java object that represents the control-flow of is interpreted within the Builder 2120, which serves as an execution environment as well.

Alternative Preferred Embodiments

While preferred embodiments of the invention have been described, it will be understood that those skilled in the art, both now and in the future, may make various improvements and enhancements which fall within the scope of the claims which follow.

Having thus described the invention, what is claimed as new and desired to be secured by Letters Patent is:

1. A computer system for workflow operation with heterogeneous components, comprising:
   a. sources, representing heterogeneous service requesters, capable of generating service requests;
   b. activities, representing units of work generated within said sources;
   c. performers, representing heterogeneous service providers, capable of performing said service requests and generating service responses;
   d. tasks, representing units of work executing within said performers in response to incoming service requests, such that each task is uniquely associated with an activity within a source;
   e. source agents that act as proxies of said sources;
   f. performer agents that act as proxies of said performers;
   g. task request and task response messages, used to transmit service requests and service responses between said source agents and performer agents;
   h. a continuously available network to which said source agents and said performer agents are always connected.

2. The system of claim 1, wherein each source comprises:
   a. means for generating and issuing said service requests for said activities;
   b. means for receiving said service responses;
   c. a connection to its own unique source agent.

3. The system of claim 1, wherein each performer comprises:
   a. means for receiving said service requests;
   b. means for performing service requests as said tasks;
   c. means for generating service responses;
   d. a connection to its own unique performer agent.

4. The system of claim 2, wherein sources can comprise one or more of the group consisting of:
   a. a workflow script specified as a control and data-flow graph, a set of rules, or means executing on a centralized workflow server;
   b. a custom workflow program written in a standard programming language that implements a specific process by generating service requests in a sequence;
   c. a workflow-aware human agent implementing a specific process by generating service requests in a sequence;
   d. a long-running collaborative application that generates service requests.

5. The system of claim 3, wherein performers can comprise one or more of the group consisting of:
   a. a human participant;
   b. an automated application, including a database, a gateway, or a program or electronic device for receiving inputs and generating outputs;
   c. a workflow server;
   d. an organization, business unit;
   e. an intermediary application that receives activities from said source agents and dispatches the activities to performer agents.

6. The system of claim 1, wherein said task request represents a service request to a performer agent, comprising:
   a. activity ID, a unique, unchangeable identifier assigned by an originator source agent that identifies a specific activity in said source that caused the service request;
   b. source agent reference, a unique reference to the originator source agent of the activity, which can be used by a performer agent to identify the originator source agent;
   c. task details, which contain information about the exact type of task to be created on the performer and the input parameters required to create and start the task.

7. The system of claim 6, wherein said task request further can comprise one or more of the group consisting of:
   a. status information of said task request;
   b. annotations that provide an informal description of said task request;
   c. information about priority of said task request;
   d. information about deadlines on said task request;
   e. a detailed history or log of the routing of said task request.

8. The system of claim 1, wherein said task response represents a service response to a source agent, comprising:
   a. activity ID, which uniquely identifies an activity in said source to which the response corresponds;
   b. source agent reference, a unique reference to said source agent that generated the task request;
   c. performer agent reference, a unique reference to said performer agent which handled the task request;
   d. task ID, a unique identifier of the task executed on said performer;
   e. task result details, which contain information about the exact type of task executed on the performer and the outputs generated for the task.

9. The system of claim 8, wherein said task response further can compromise one or more of the group consisting of:
   a. annotations that provide an informal description of said task response;
   b. status information which describes if the task was completed correctly, failed, or was forwarded;
   c. a detailed history or log of the routing of said task response.

10. The system of claim 1, wherein each source agent comprises:
    a. a continuous connection to said network;
    b. a task response handler component, for receiving and handling said task responses over said network on behalf of its source;
    c. a task request dispatcher component, which generates said task requests from said service requests and dispatches them to said performer agents via said network.

11. The system of claim 1, wherein each performer agent comprises:
    a. a continuous connection to said network;
    b. a task request handler component, for receiving and handling task requests over said network for its performer;
    c. a task response dispatcher component, which constructs said task responses from said service responses and returns them to said source agents via said network.

12. The system of claim 11, wherein said performer agent is a client to its performer, which is an automated application or server.

13. The system of claim 11, wherein said performer agent is a worklist which is a persistent store of arriving task requests, and its performer is a human or application accessing it via a pull client application resident on a connected computing device.

14. The system of claim 13, wherein said pull client application comprises a user interface, comprising:
   a. means for being notified by the performer agent about the arrival of new task requests on the worklist;
   b. means for explicitly refreshing the content of the worklist;
   c. means for downloading specific task requests from the performer agent.

15. The system of claim 11, wherein said performer agent is a push server that pushes arriving task requests to its performer via a push client application residing on a connected computing device.

16. The system of claim 11, wherein a performer agent further can comprise one or more of the group consisting of:
   a. means for enabling said source agents on said network to request a listing of the capabilities and services available on a performer;
   b. means for enabling authorized source agents on said network to request that a task currently in progress be aborted;
   c. means for enabling authorized source agents on said network to request that a task currently in progress be suspended;
   d. means for enabling authorized source agents on said network to request that a task currently in suspension be resumed;
   e. means for enabling authorized source agents on said network to request the status of a task request;
   f. means for enabling authorized source agents on said network to request the current workload on the performer agent.

17. The system of claim 1, further comprising a directory means comprising:
   a. means for registering location information of said performer agents;
   b. means for registering service capabilities of said performer agents;
   c. means for mediating between service requirements of said source agents and the service capabilities of said performer agents;
   d. means for enabling said source agents to retrieve location information of matching performer agents subsequent to mediation;
   e. means for unregistering location information of said performer agents.

18. The system of claim 13, further comprising worklist servers on which said worklists are created and managed on said network.

19. The system of claim 1, wherein said network comprises:
   a. a network means, comprising one or more of the group consisting of a LAN, WAN, Internet, Intranet, Extranet and wireless network;
   b. a communication means, comprising one or more of the group consisting of electronic mail, TCP/IP sockets, RPC, HTTP, and IIOP.

20. The system of claim 11, wherein a performer agent further comprises means for acting as an intermediary, role, or group, by receiving said task requests from said source agents and dispatching said task requests to said performer agents.

21. The system of claim 13, further comprising means for enabling multiple performers to share a single performer agent which is a worklist, thus providing the functionality of a shared worklist.

22. The system of claim 10, further comprising means for enabling multiple sources to re-use a single source agent, comprising:
   a. source identifiers that can be used by said source agent to resolve each source;
   b. a mapping of each task response to its corresponding activity and said source by the source agent.

23. The system of claim 1, further comprising a workflow specification environment, comprising:
   a. means for enabling a human workflow designer to create a workflow script by graphical specification as a template and store it in a workflow template repository;
   b. means for enabling a human workflow designer/administrator to create an instance of a source and its source agent by instantiating a template from the workflow template repository;
   c. means for enabling a human workflow designer/administrator to monitor the execution of said source, and modify the specification graphically.

24. A computer system for peer-to-peer workflow operation between workflow systems, comprising:
   a. sources, representing instances of executing workflows that represent processes such as data and control flow graphs, sets of rules, or other custom programs;
   b. activities, representing units of work generated within said sources;
   c. performers, representing instances of workflow systems;
   d. tasks, representing units of work executing within said performers in response to service requests, such that each task is uniquely associated with an activity within a source;
   e. source agents that act as proxies of said sources;
   f. performer agents that act as proxies of said performers;
   g. task request and task response messages, used to transmit service requests and service responses between said source agents and performer agents;
   h. a continuously available network to which said source agents and said performer agents are always connected.

25. The system of claim 24, wherein each performer comprises:
   a. a connection to its own unique performer agent;
   b. a local repository of workflow script templates;
   c. means for receiving execution requests for workflow script execution via its performer agent;
   d. means for creating said workflow scripts from said local repository in response to said execution requests;
   e. means for execution of said workflow scripts on a local workflow execution environment;
   f. means for returning the results of said workflow script execution to said sources.

26. The system of claim 24, wherein each source comprises:
   a. a connection to its own unique source agent;
   b. means for generating requests for workflow script executions on remote performers;
   c. means for receiving the results of workflow script executions on said remote performers, via its source agent.

27. The system of claim 24, wherein said task request represents a service request to a performer agent, comprising:
   a. activity ID, a unique, unchangeable identifier assigned by an originator source agent that identifies a specific activity in said source that caused the service request;

b. source agent reference, a unique reference to said originator source agent of the activity, which can be used by a performer agent to identify the originator source agent;
c. task details, which contain a request for a workflow script template available in the local repository of said performer to be instantiated and executed on said performer, and input data required for the creation and execution of said workflow script.

28. The system of claim 27, wherein said task request further can comprise one or more of the group consisting of:
a. status information of said task request;
b. annotations that provide an informal description of said task request;
c. information about priority of said task request;
d. information about deadlines on said task request;
e. a detailed history or log of the routing of said task request.

29. The system of claim 28, wherein task details further comprise the workflow script template that is to be instantiated and executed on said performer.

30. The system of claim 29, wherein task details further comprise a portable workflow execution environment that is required to execute said workflow script downloaded on said performer.

31. The system of claim 24, wherein said task response represents a service response to a source agent, comprising:
a. activity ID, which uniquely identifies an activity in said source to which the response corresponds;
b. source agent reference, a unique reference to said source agent that generated the task request;
c. performer agent reference, a unique reference to said performer agent which handled the task request;
d. task ID, a unique identifier of the task executed on said performer;
e. task result details, which contain information about the exact type of task executed on the performer and the outputs generated.

32. The system of claim 31, wherein said task response further can comprise one or more of the group consisting of:
a. annotations that provide an informal description of said task response;
b. status information which describes if the task was completed correctly, failed, or was forwarded;
c. a detailed history or log of the routing of said task response.

33. The system of claim 24, wherein each source agent comprises:
a. a continuous connection to said network;
b. a task response handler component, for receiving and handling said task responses over said network on behalf of its source;
c. a task request dispatcher component, which generates said task requests from said service requests and dispatches them to said performer agents via said network.

34. The system of claim 24, wherein each performer agent comprises:
a. a continuous connection to said network
b. a task request handler component, for receiving and handling task requests for its performer;
c. a task response dispatcher component, which constructs said task responses from said service responses and returns the task responses to the source agents via said network.

35. The system of claim 33, wherein a single source agent can be utilized by multiple sources, and comprising:
a. means for said task request dispatcher to receive service requests from multiple sources and post them as task requests to appropriate performer agents;
b. means for said task response handler to return service responses to appropriate sources based on the origin of the service request.

36. The system of claim 24, wherein said network comprises:
a. a network means, comprising one or more of the group consisting of a LAN, WAN, Internet, Intranet, Extranet and wireless network;
b. a communication means, comprising one or more of the group consisting of electronic mail, TCP/IP sockets, RPC, HTTP and IIOP.

37. A computer system for workflow operation with disconnected or occasionally connected components, comprising:
a. sources, representing heterogeneous service requestors, capable of generating service requests;
b. activities, representing units of work generated within said sources;
c. performers, representing heterogeneous service providers, capable of performing said service requests and generating service responses;
d. tasks, representing units of work executing within said performers in response to service requests, such that each task is uniquely associated with an activity within a source;
e. source agents that act as proxies of said sources;
f. performer agents that act as proxies of said performers;
g. task request and task response messages, used to transmit service requests and service responses between said source agents and performer agents;
h. a continuously available network to which said source agents and said performer agents are always connected;
i. an occasionally available source-side network between said source and said source agent;
j. an occasionally available performer-side network between said performer and said performer agent.

38. The system of claim 37, wherein each source comprises:
a. means for generating and issuing said service requests for said activities;
b. means for receiving said service responses;
c. a connection to its own unique source agent;
d. a mechanism for connecting with and disconnecting from its own source agent over said source-side network.

39. The system of claim 37, wherein each performer comprises:
a. means for receiving said service requests;
b. means for performing service requests as said tasks;
c. means for generating service responses;
d. a connection to its own unique performer agent;
e. a mechanism for connecting with and disconnecting from its own performer agent over said performer-side network.

40. The system of claim 37, wherein said task request represents a service request to a performer agent, comprising:
a. activity ID, a unique, unchangeable identifier assigned by an originator source agent that identifies a specific activity in said source that caused the service request;

b. source agent reference, a unique reference to the originator source agent of the activity, which can be used by a performer agent to identify the originator source agent;

c. task details, which contain information about the exact type of task to be created on the performer and the input parameters required to create and start the task.

41. The system of claim 40, wherein said task request further can comprise one or more of the group consisting of:

a. status information of said task request;

b. annotations that provide an informal description of said task request;

c. information about priority of said task request;

d. information about deadlines on said task request;

e. a detailed history or log of the routing of said task request.

42. The system of claim 37, wherein said task response represents a service response to a source agent, comprising:

a. activity ID, which uniquely identifies an activity in said source to which the response corresponds;

b. source agent reference, a unique reference to said source agent that generated the task request;

c. performer agent reference, a unique reference to said performer agent which handled the task request;

d. task ID, a unique identifier of the task executed on said performer;

e. task result details, which contain information about the exact type of task executed on the performer and the outputs generated on the task.

43. The system of claim 42, wherein said task response further can comprise one or more of the group consisting of:

a. annotations that provide an informal description of said task response;

b. status information which describes if the task was completed correctly, failed, or was forwarded;

c. a detailed history or log of the routing of said task response.

44. The system of claim 37, wherein each source agent comprises:

a. a continuous connection to said network;

b. means for potential disconnected operation from its source, comprising,
  i. means for accepting connection requests from said associated source via said source-side network,
  ii. means for accepting disconnect requests from its source,
  iii. a task response queue component, for receiving and temporarily storing said task responses over said network,
  iv. a task response handler component, for receiving and handling said task responses over said network on behalf of its source, and returning them to said source when it is connected,
  v. a task request dispatcher component, which generates said task requests from said service requests and dispatches them to said performer agents via said network.

45. The system of claim 37, wherein each performer agent comprises:

a. a continuous connection to said network;

b. means for potential disconnected operation from its performer, comprising,
  i. means for accepting connection requests from said performer via said performer-side network,
  ii. means for accepting disconnect requests from said performer,
  iii. a task request queue component, for an authorized source agent to send a task request over said network and for temporarily storing the incoming task requests,
  iv. a task request handler component, for receiving and handling task requests for its said performer,
  v. a task response dispatcher component, which constructs said task responses from said service responses and returns them to the originating source agent via said network.

46. The system of claim 37, wherein said network comprises:

a. a network means, comprising one or more of the group consisting of a LAN, WAN, Internet, Intranet, Extranet and wireless network;

b. a communication means, comprising one or more of the group consisting of electronic mail, TCP/IP sockets, RPC, HTTP and IIOP.

47. The system of claim 37, wherein said source-side network comprises:

a. a network means, comprising one or more of the group consisting of a LAN, WAN, Internet, Intranet, Extranet and wireless network;

b. a communication means such as electronic mail, TCP/IP sockets, RPC, HTTP and IIOP.

48. The system of claim 37, wherein said performer-side network comprises:

a. a network means, comprising one or more of the group consisting of a LAN, WAN, Internet, Intranet, Extranet and wireless network;

b. a communication means, comprising one or more of the group consisting of electronic mail, TCP/IP sockets, RPC, HTTP and IIOP.

* * * * *